(12) United States Patent
shimizu et al.

(10) Patent No.: US 10,771,232 B2
(45) Date of Patent: Sep. 8, 2020

(54) INFORMATION PROCESSING APPARATUS, TIME SYNCHRONIZATION METHOD, AND COMPUTER-READABLE RECORDING MEDIUM RECORDING TIME SYNCHRONIZATION PROGRAM

(71) Applicant: FUJITSU LIMITED, Kawasaki-shi, Kanagawa (JP)

(72) Inventors: takashi shimizu, kawasaki (JP); Ken Yokoyama, Kawasaki (JP); Hiroshi Murakawa, Yodogawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/693,456

(22) Filed: Nov. 25, 2019

(65) Prior Publication Data
US 2020/0228305 A1 Jul. 16, 2020

(30) Foreign Application Priority Data

Jan. 10, 2019 (JP) ................ 2019-002774

(51) Int. Cl.
*H04L 7/00* (2006.01)
*H04L 7/04* (2006.01)

(52) U.S. Cl.
CPC ..................... *H04L 7/04* (2013.01)

(58) Field of Classification Search
CPC ... H04B 17/00; H04J 3/06; H04J 3/24; H04K 1/10; H04L 7/00; H04L 7/02; H04L 7/04;
(Continued)

(56) References Cited

U.S. PATENT DOCUMENTS

| 7,835,366 B2 * | 11/2010 | Aweya | H04J 3/0667 |
| | | | 370/395.62 |
| 2009/0086764 A1 * | 4/2009 | Lee | H04L 69/28 |
| | | | 370/503 |

(Continued)

FOREIGN PATENT DOCUMENTS

| JP | 2015-19223 | 1/2015 |
| WO | 2018/151202 A1 | 8/2018 |

OTHER PUBLICATIONS

Extended Extended European Search Report dated Jun. 2, 2020 for corresponding European Patent Application No. 19210588.0, 7 pages.

*Primary Examiner* — Shawkat M Ali
(74) *Attorney, Agent, or Firm* — Fujitsu Patent Center

(57) ABSTRACT

An information processing apparatus includes: a memory configured to store first system time; and a processor configured to: receive, from an information acquisition apparatus after the first system time is written in the memory, first information acquired by the information acquisition apparatus and first time information indicating acquisition time of the first information; receive, from the information acquisition apparatus after receiving the first information and the first time information, second information and second time information indicating acquisition time of the second information; converting, based on the first system time, reception time at which the first information and the first time information are received into second system time; convert, based on the second system time and the first time information, the second time information into third system time; attach the second system time to the first information; and attach the third system time to the second information.

14 Claims, 19 Drawing Sheets

(58) Field of Classification Search
CPC ......... H04L 12/24; H04L 12/26; H04L 12/28;
H04L 12/56; H04L 41/50; H04W 4/00;
H04W 24/04; H04W 56/00; H04W 56/001
USPC ........ 370/252, 350, 395, 503, 509; 375/224, 375/260, 267, 354, 355; 455/502; 709/202, 204, 248
See application file for complete search history.

(56) References Cited

U.S. PATENT DOCUMENTS

| | | |
|---|---|---|
| 2010/0250781 A1 | 9/2010 | Matsunaga |
| 2012/0263220 A1* | 10/2012 | Li .................... H04W 56/00 375/224 |
| 2013/0326088 A1* | 12/2013 | Uchida ............... H04L 41/50 709/248 |
| 2014/0314068 A1* | 10/2014 | Wentink ............. H04W 56/001 370/350 |
| 2015/0358933 A1 | 12/2015 | Yamamoto et al. |
| 2017/0041688 A1 | 2/2017 | Pitigoi-Aron et al. |
| 2018/0006798 A1* | 1/2018 | Bilstad ................ H04J 3/0682 |
| 2018/0049147 A1* | 2/2018 | Chen ................ H04W 56/0015 |

* cited by examiner

FIG. 14

| OS_time | Sub OUTPUT | FPGA_freq |
|---|---|---|
| 15:00:05 | 11000 | |
| 15:00:10 | 10000 | 10000/(10-5)=2000 |
| 15:00:16 | 11000 | 11000/(16-10)=1833 |

FIG. 15

| sensor_cnt | FPGA_cur_clk | FPGA_freq | sensor_freq |
|---|---|---|---|
| 1010 | 2050 | 2000 | |
| 1050 | 2071 | 2000 | {((1050-1010)/(2071-2050))*2000=3810 |
| 1150 | 2125 | 2000 | {((1150-1050)/(2125-2071))*2000=3704 |

FIG. 16

| OS_time | sensor_cnt | 1st_pkt_ck | first_pktflag | FPGA_freq | sensor_freq | Real_time |
|---|---|---|---|---|---|---|
| 15:00:05 | - | 0 | 0 | 2000 | 4000 | |
| | 1010 | 50 | 1 | 2000 | 4000 | 50/2000+15:00:05=15:00:05:025 |
| | 1050 | 50 | 1 | 2000 | 3810 | (1050-1010)/3810+50/2000+15:00:05= 15:00:05:035 |
| | 1150 | 50 | 1 | 2000 | 3704 | (1150-1010)/3740+50/2000+15:00:05= 15:00:05:063 |

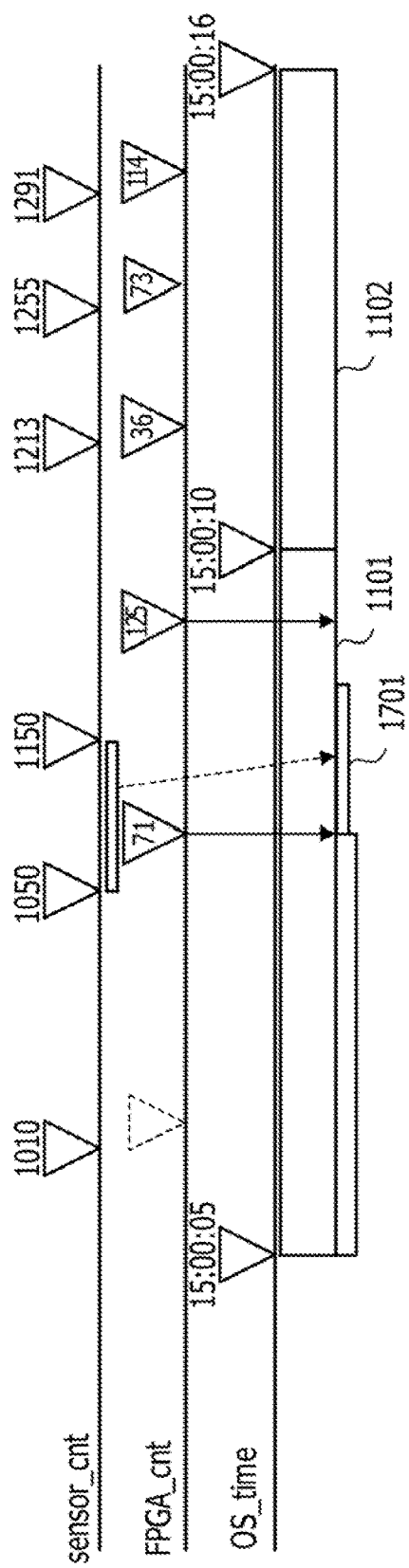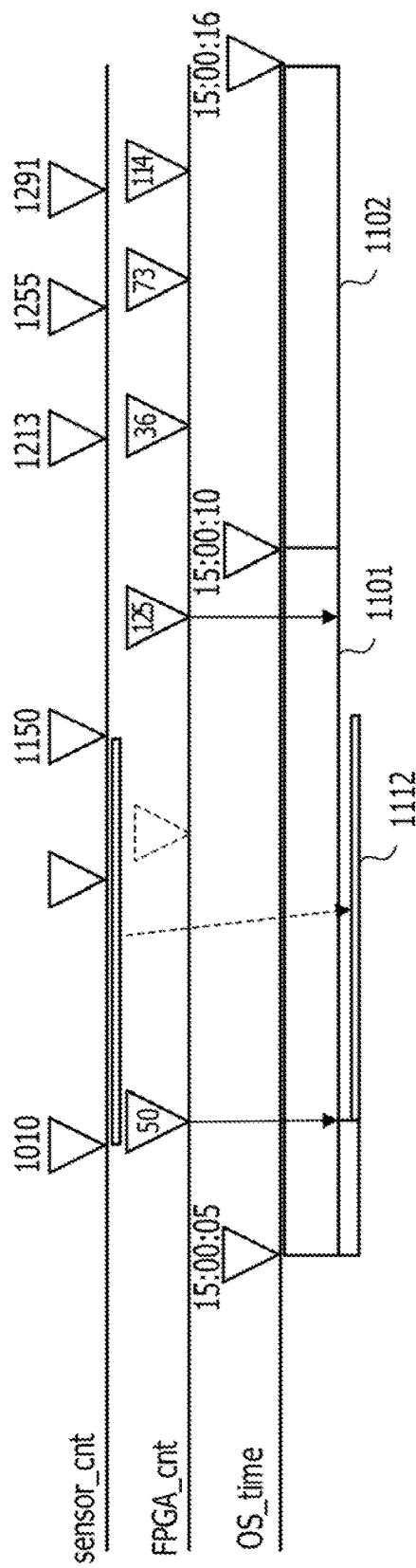
FIG. 17A
FIG. 17B 10,771,232 B2

INFORMATION PROCESSING APPARATUS, TIME SYNCHRONIZATION METHOD, AND COMPUTER-READABLE RECORDING MEDIUM RECORDING TIME SYNCHRONIZATION PROGRAM

CROSS-REFERENCE TO RELATED APPLICATION

This application is based upon and claims the benefit of priority of the prior Japanese Patent Application No. 2019-2774, filed on Jan. 10, 2019, the entire contents of which are incorporated herein by reference.

FIELD

The embodiment discussed herein is related to an information processing apparatus, a time synchronization method, and a computer-readable recording medium.

BACKGROUND

In an information processing system, information from a plurality of sensors is collected.

Related art is disclosed in Japanese Laid-open Patent Publication No. 2015-19223 and International Publication Pamphlet No. WO 2018/151202.

SUMMARY

According to an aspect of the embodiments, an information processing apparatus includes: a memory configured to store first system time; and a processor coupled to the memory and configured to: receive, from an information acquisition apparatus after the first system time is written in the memory, first information acquired by the information acquisition apparatus and first time information indicating acquisition time of the first information; receive, from the information acquisition apparatus after receiving the first information and the first time information, second information and second time information indicating acquisition time of the second information; converting, based on the first system time, reception time at which the first information and the first time information are received into second system time; convert, based on the second system time and the first time information, the second time information into third system time; attach the second system time to the first information; and attach the third system time to the second information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 106 is a flowchart (part 2) illustrating the specific example of the time synchronization process;
FIG. 1 is a configuration diagram of a first frequency calculation unit;
FIG. 14 is a diagram illustrating frequencies of a clock signal;
FIG. 15 is a diagram illustrating frequencies of a timing signal;
FIG. 16 is a diagram illustrating OS time;
FIGS. 17A and 17B are diagrams each illustrating the time synchronization process performed at the time of packet loss.

DESCRIPTION OF EMBODIMENTS

Figure 1:
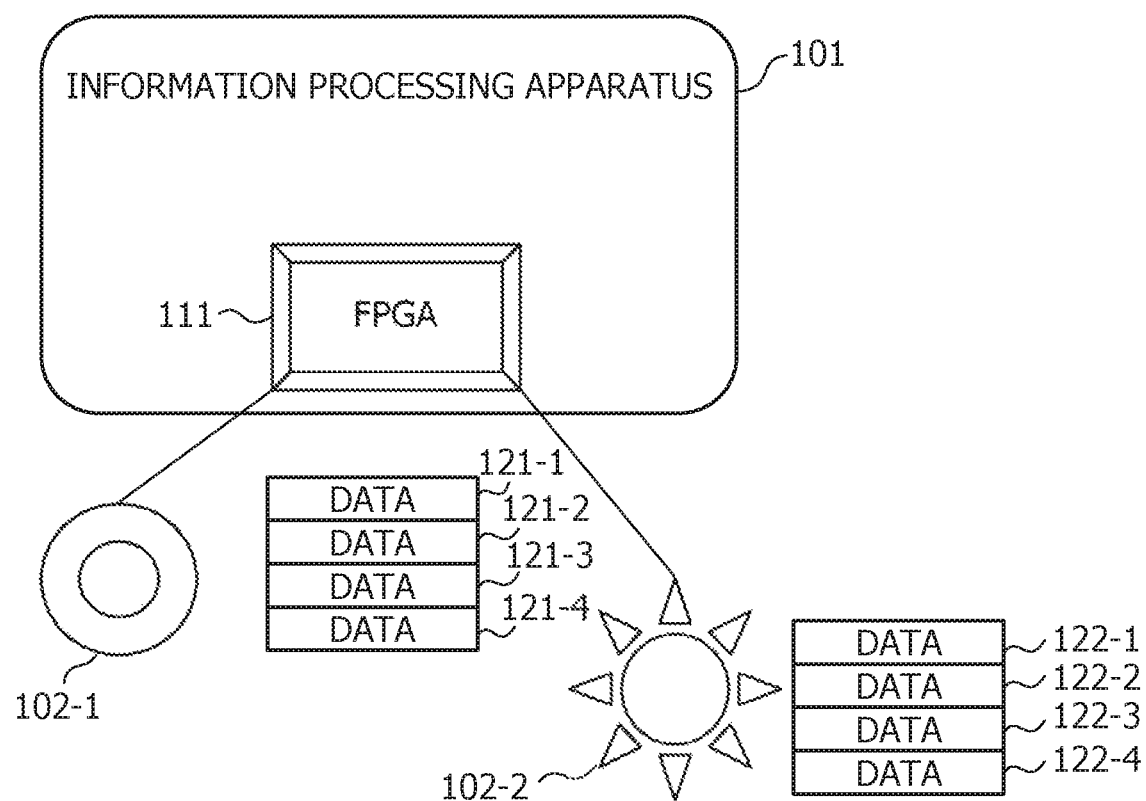
FIG. 1 is a configuration diagram of an information processing system of the related art.

FIG. 1 illustrates an example of a configuration of an information processing system of the related art for collecting information from a plurality of sensors. The information processing system illustrated in FIG. 1 includes an information processing apparatus 101, a sensor 102-1, and a sensor 102-2. The information processing apparatus 101 includes a field-programmable gate array (FPGA) 111.

The sensor 102-1 and the sensor 102-2 operate in synchronization with different timing signals. The sensor 102-1 acquires data 121-1 to data 121-4 and transmits the acquired data to the information processing apparatus 101 while buffering the data. Similarly, the sensor 102-2 acquires data 122-1 to data 122-4 and transmits the acquired data to the information processing apparatus 101 while buffering the data.

The FPGA 111 receives the data 121-1 to the data 121-4 from the sensor 102-1 and receives the data 122-1 to the data 122-4 from the sensor 102-2. The FPGA 111 performs information processing on the received data.

For example, in relation to sensors, a sensor information processing apparatus that temporally associates with each other measurement results obtained by a plurality of sensors and a sensing system with which a timestamp with less error for sensor data is obtained may be provided.

When an information processing apparatus processes information collected from a plurality of sensors, the information processing apparatus may attach a timestamp indicating time to each piece of the information in some cases. However, when the sensors are operating in synchronization with different timing signals, times based on the timing signals of the plurality of sensors are neither synchronized with each other nor are synchronized with system time of the information processing apparatus.

The time synchronization problem is not limited to the case where information is collected from a plurality of sensors but also occurs in the case where information is collected from a single sensor.

In one aspect, time at which an information acquisition apparatus has acquired information may be synchronized with system time of an information processing apparatus that processes the acquired information.

An embodiment will be described in detail below with reference to the drawings.

Figure 2:
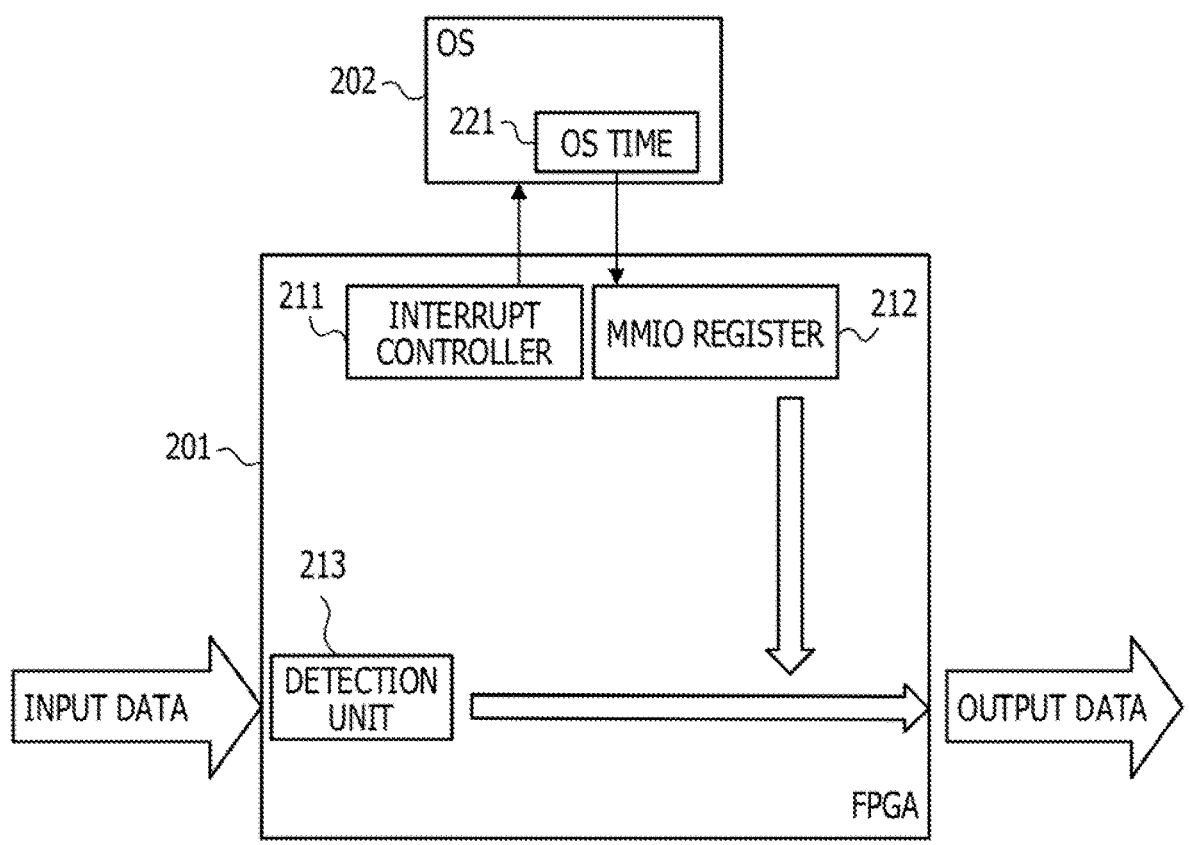
FIG. 2 is a diagram illustrating a first comparative example of an FPGA.

FIG. 2 illustrates a first comparative example of an FPGA that attaches a timestamp to data. An FPGA 201 illustrated in FIG. 2 includes an interrupt controller 211, a memory-mapped input output (MMIO) register 212, and a detection unit 213.

Upon receiving input data from a sensor, the detection unit 213 outputs a detection signal to the interrupt controller 211. Upon receiving the detection signal, the interrupt controller 211 requests an operating system (OS) 202 to perform time synchronization by interruption or polling. The OS 202 acquires OS time 221 based on the request from the interrupt controller 211, and writes the OS time 221 in the MMIO register 212 of the FPGA 201. The OS time 221 is an example of system time.

The FPGA 201 attaches, as a timestamp, the OS time 221 written in the MMIO register 212 to the input data output by the detection unit 213, and outputs output data to which the timestamp has been attached.

However, in the configuration illustrated in FIG. 2, the timestamp of the output data indicates the OS time of the timing at which the FPGA 201 has received the input data and does not indicate the OS time of the timing at which the sensor has acquired the input data.

Figure 3:
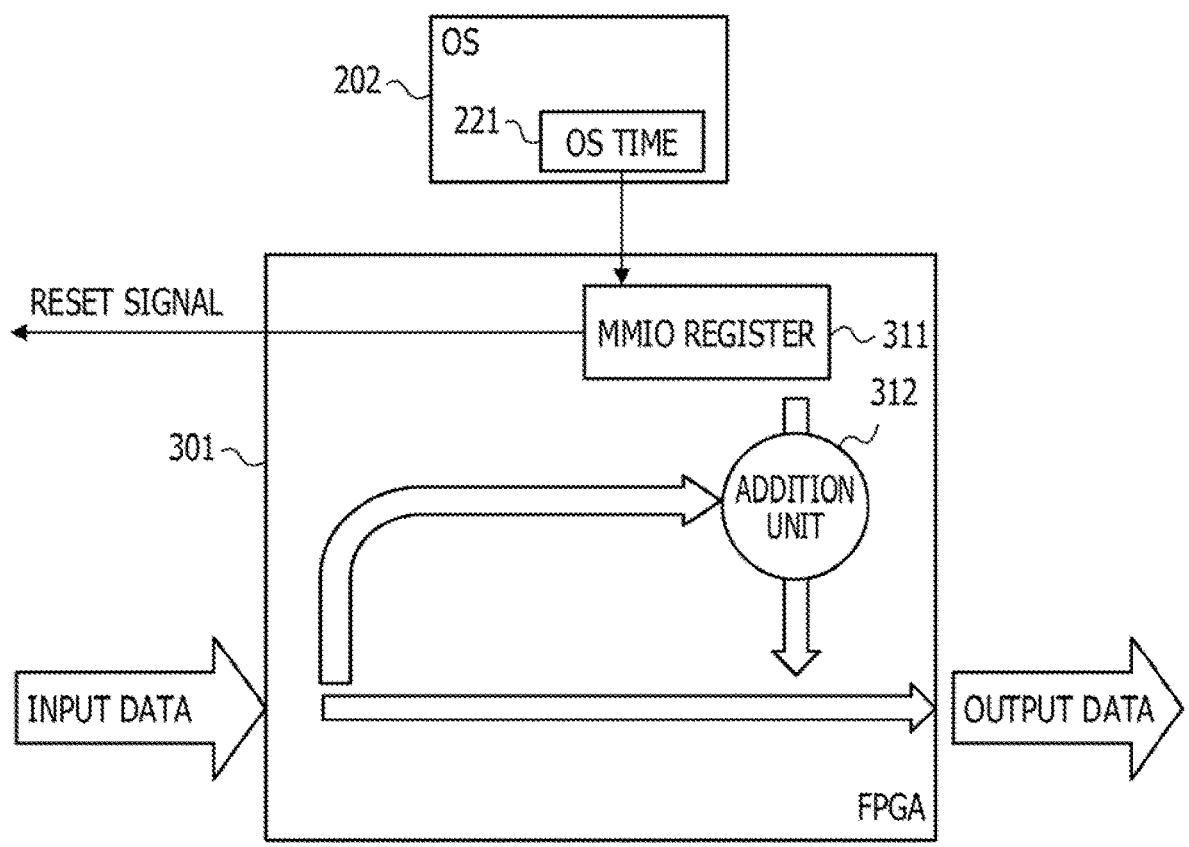
FIG. 3 is a diagram illustrating a second comparative example of an FPGA.

FIG. 3 illustrates a second comparison example of an FPGA that attaches a timestamp to data. An FPGA 301 illustrated in FIG. 3 includes an MMIO register 311 and an addition unit 312.

A sensor includes a counter that increments a count value in synchronization with a timing signal. The sensor attaches the count value obtained when input data is acquired to the input data, and transmits the input data to the FPGA 301.

The OS 202 periodically acquires the OS time 221 and writes the OS time 221 in the MMIO register 311 of the FPGA 301. Upon the OS time 221 being written in the MMIO register 311, the FPGA 301 transmits a reset signal to the sensor. Upon receiving the reset signal, the sensor resets the counter.

Upon receiving input data from the sensor, the FPGA 301 acquires the count value from the input data. The addition unit 312 adds time indicated by the count value to the OS time 221 written in the MMIO register 311 to generate a timestamp. The FPGA 301 attaches the generated timestamp to the input data, and outputs output data to which the timestamp has been attached.

However, in the configuration illustrated in FIG. 3, the count value attached to the input data includes the communication overhead of transmitting the reset signal from the FPGA 301 to the sensor. Therefore, the timestamp generated from the count value does not necessarily indicate the OS time of the timing at which the sensor has acquired the input data.

Figure 4:
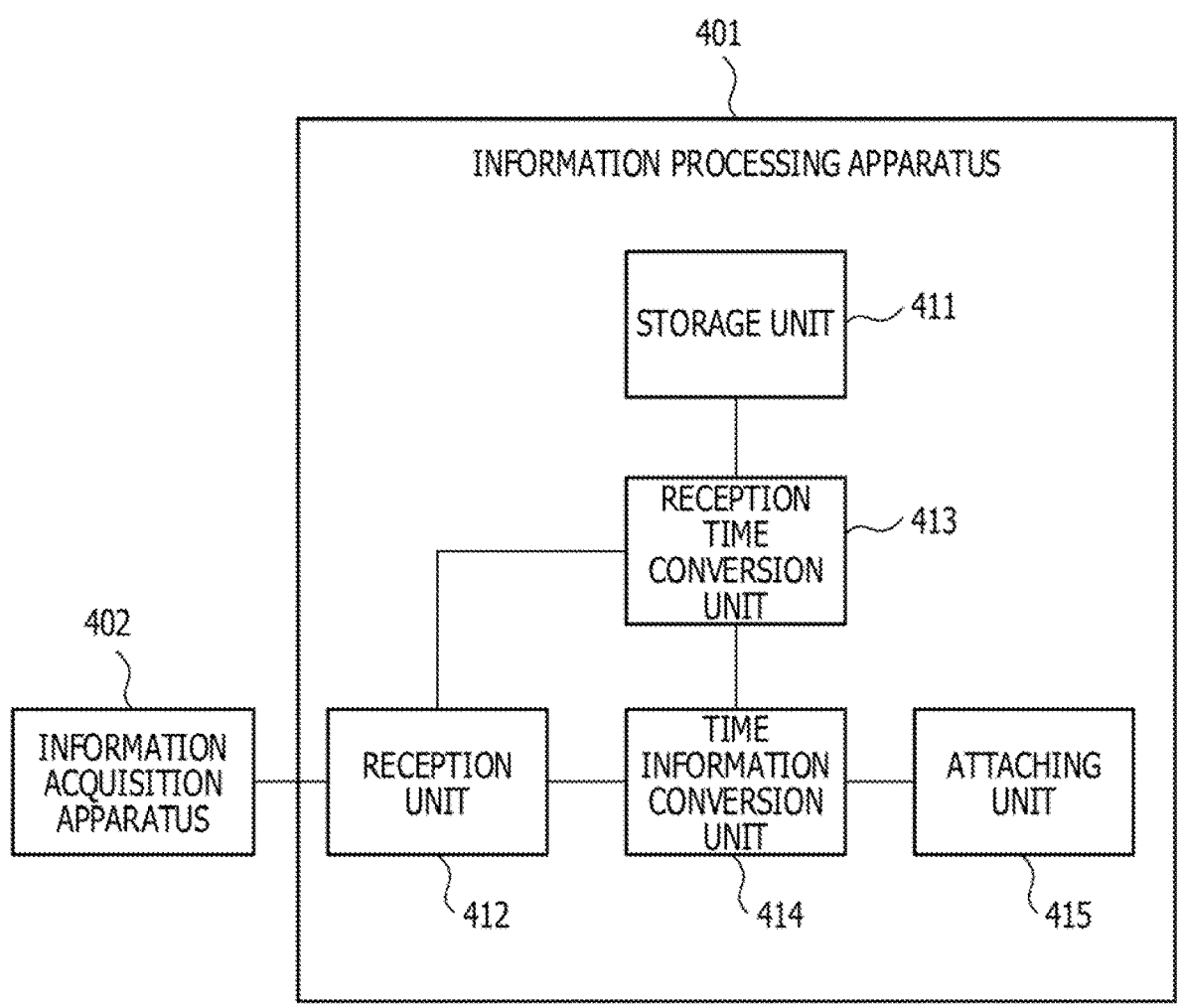
FIG. 4 is a functional configuration diagram of an information processing apparatus.
Figure 5:
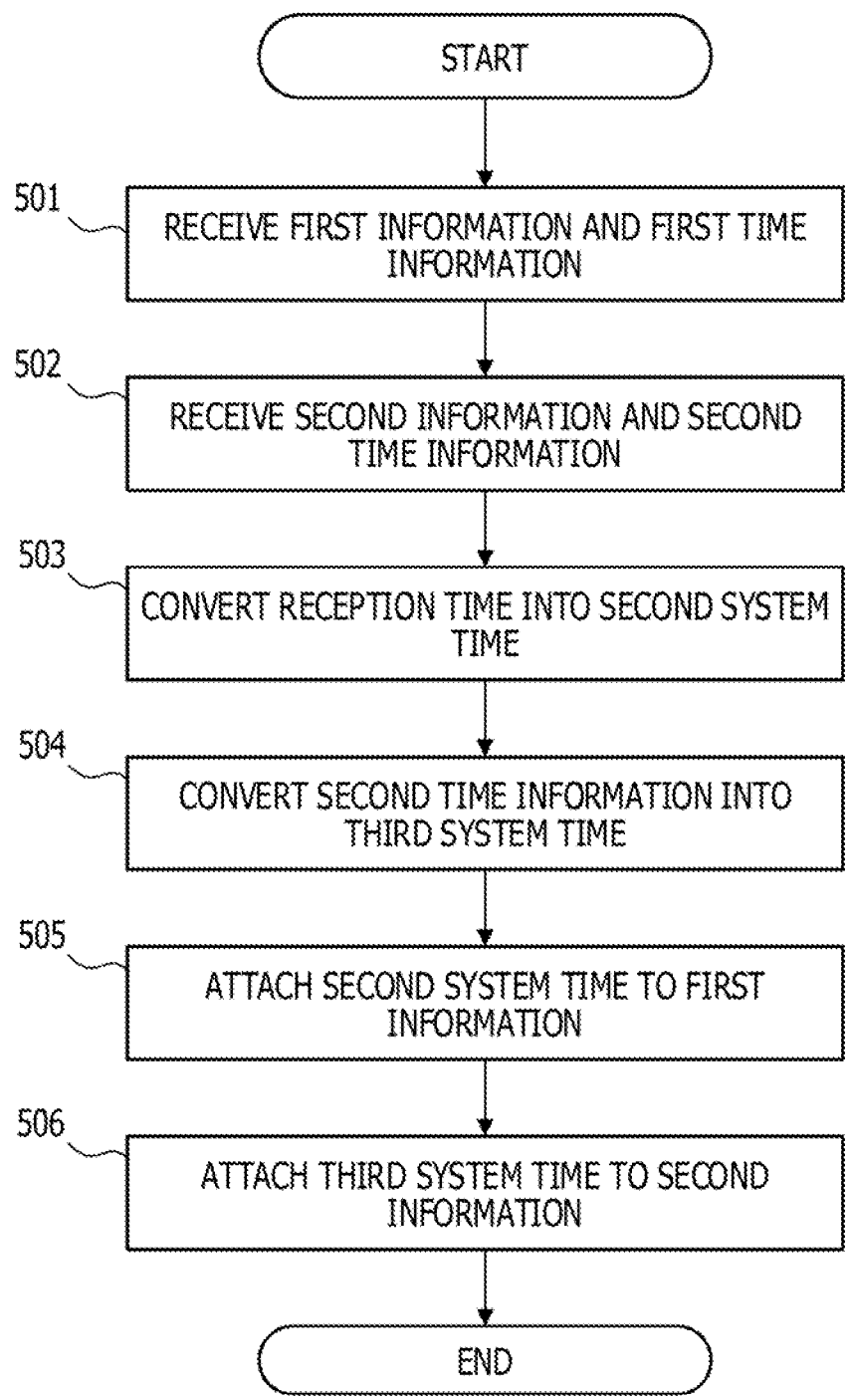
FIG. 5 is a flowchart of a time synchronization process.

FIG. 4 illustrates an example of a functional configuration of an information processing apparatus according to an embodiment. An information processing apparatus 401 illustrated in FIG. 4 includes a storage unit 411, a reception unit 412, a reception time conversion unit 413, a time information conversion unit 414, and an attaching unit 415. The storage unit 411 stores first system time, FIG. 5 is a flowchart illustrating an example of a time synchronization process performed by the information processing apparatus 401 illustrated in FIG. 4. First, after the first system time is written in the storage unit 411, the reception unit 412 receives first information acquired by an information acquisition apparatus 402 and first time information indicating the acquisition time of the first information from the information acquisition apparatus 402 (step 501). After receiving the first information and the first time information, the reception unit 412 receives second information and second time information indicating the acquisition time of the second information from the information acquisition apparatus 402 (step 502).

The reception time conversion unit 413 converts, based on the first system time, reception time at which the reception unit 412 has received the first information and the first time information into second system time (step 503). The time information conversion unit 414 converts, based on the second system time and the first time information, the second time information into third system time (step 504). The attaching unit 415 attaches the second system time to the first information (step 505), and attaches the third system time to the second information (step 506).

The information processing apparatus 401 illustrated in FIG. 4 is capable of synchronizing time at which an information acquisition apparatus has acquired information with system time of an information processing apparatus that processes the acquired information.

Figure 6:
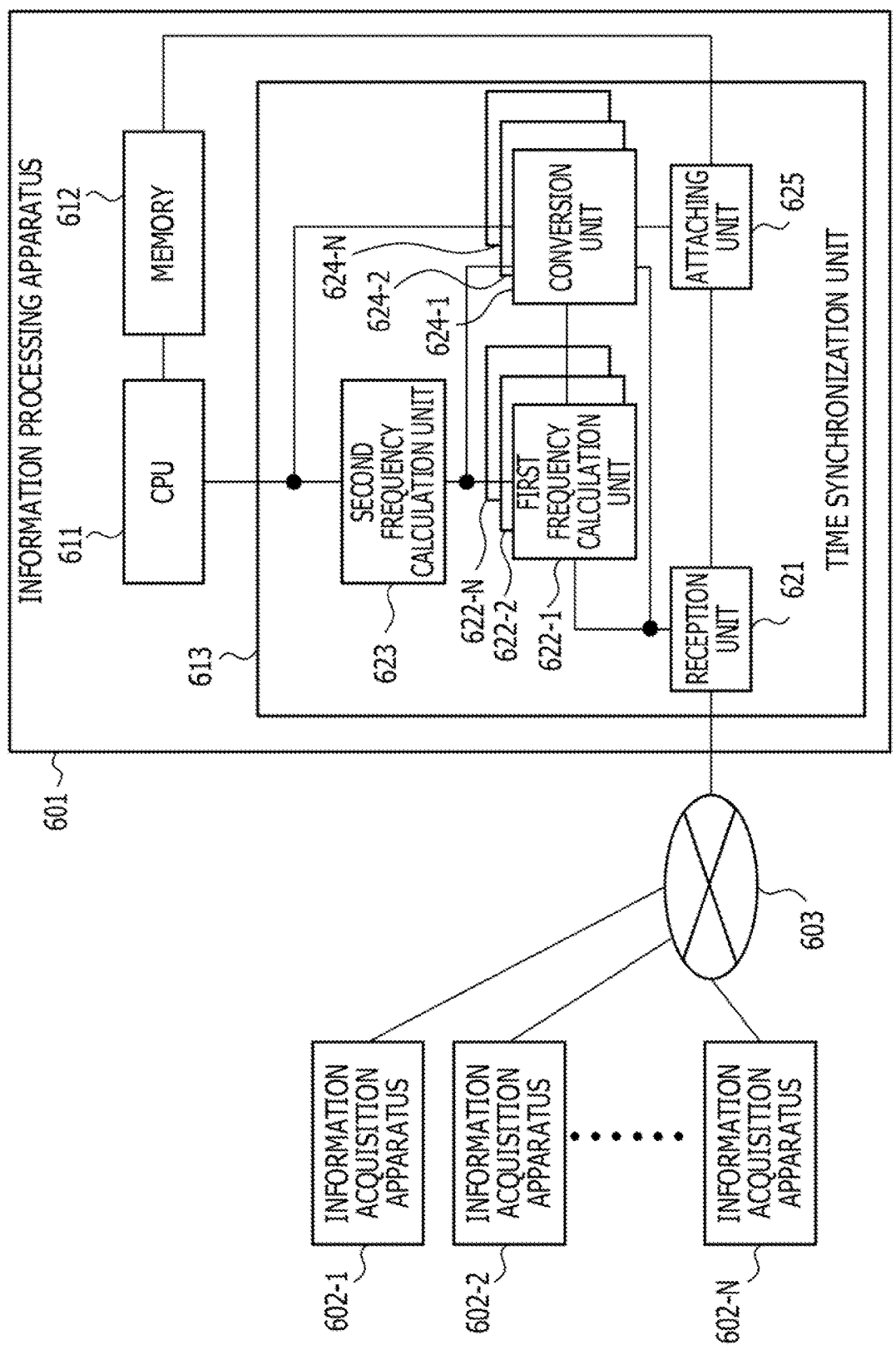
FIG. 6 is a configuration diagram of an information processing system according to an embodiment.

FIG. 6 illustrates an example of a configuration of an information processing system according to the embodiment. An information processing system illustrated in FIG. 6 includes an information processing apparatus 601 and information acquisition apparatuses 602-1 to 602-N (where, N is an integer greater than 1). The information processing apparatus 601 corresponds to the information processing apparatus 401 illustrated in FIG. 4, and each information acquisition apparatuses 602-$i$ ($i$=1 to N) corresponds to the information acquisition apparatus 402 illustrated in FIG. 4. The information processing apparatus 601 and the information acquisition apparatuses 602-$i$ are capable of communicating with each other via a communication network 603.

The information acquisition apparatus 602-$i$ includes various sensors, an imaging apparatus, a microphone, or the like, and acquires certain information. For example, when the information acquisition apparatus 602-$i$ includes a pressure sensor, information indicating an air pressure, a water pressure, or the like is acquired. When the information acquisition apparatus 602-$i$ includes a temperature sensor, information indicating a temperature is acquired. When the information acquisition apparatus 602-$i$ includes an imaging apparatus, image information is acquired. When the information acquisition apparatus 602-$i$ includes a microphone, audio information is acquired. The sensor included in the information acquisition apparatus 602-$i$ may be a humidity sensor, a wind sensor, or the like.

The information acquisition apparatus 602-$i$ attaches time information indicating acquisition time of information to the acquired information to generate a packet of sensor data, and transmits the generated packet to the information processing apparatus 601. The information acquisition apparatus 602-$i$ generates the time information by using a timing signal.

The information processing apparatus 601 includes a central processing unit (CPU) 611, a memory 612, and a time synchronization unit 613. The CPU 611 (processor) outputs, to the time synchronization unit 613, OS time that is periodically updated by the Network Time Protocol (NTP).

Based on the OS time output by the CPU 611, the time synchronization unit 613 attaches, to certain information included in a packet received from the information acquisition apparatus 602-$i$, the OS time indicating the acquisition time of the information to generate transfer data. The time synchronization unit 613 transfers the generated transfer data to the memory 612. The memory 612 stores the transferred transfer data. The CPU 611 performs information processing on the transfer data stored in the memory 612.

The time synchronization unit 613 includes a reception unit 621, first frequency calculation units 622-1 to 622-N, a second frequency calculation unit 623, conversion units 624-1 to 624-N, and an attaching unit 625. The reception unit 621 and the attaching unit 625 correspond to the reception unit 412 and the attaching unit 415 illustrated in FIG. 4, respectively.

The reception unit 621 receives a packet from the information acquisition apparatus 602-$i$, outputs certain information included in the packet to the attaching unit 625, and outputs time information included in the packet to the first frequency calculation unit 622-$i$ and the conversion unit 624-$i$.

The second frequency calculation unit 623 calculates a frequency of a clock signal used in the time synchronization unit 613 by using the OS time output by the CPU 611 and the clock signal. The second frequency calculation unit 623 outputs the calculated frequency of the clock signal to the first frequency calculation units 622-1 to 622-N and the conversion units 624-1 to 624-N.

The first frequency calculation unit 622-$i$ calculates a frequency of a timing signal used in the information acquisition apparatus 602-$i$ by using a difference in time information included in two packets, the clock signal used in the time synchronization unit 613, and the frequency of the clock signal output by the second frequency calculation unit 623. The first frequency calculation unit 622-$i$ outputs the calculated frequency of the timing signal to the conversion unit 624-$i$.

The conversion unit 624-$i$ converts, based on the OS time output by the CPU 611, the time information output by the reception unit 621 into the OS time, and outputs the OS time to the attaching unit 625. The attaching unit 625 attaches, as a timestamp, the OS time output by the conversion unit 624-$i$ to the certain information output by the reception unit 621 to generate transfer data, and transfers the generated transfer data to the memory 612.

Figure 7:
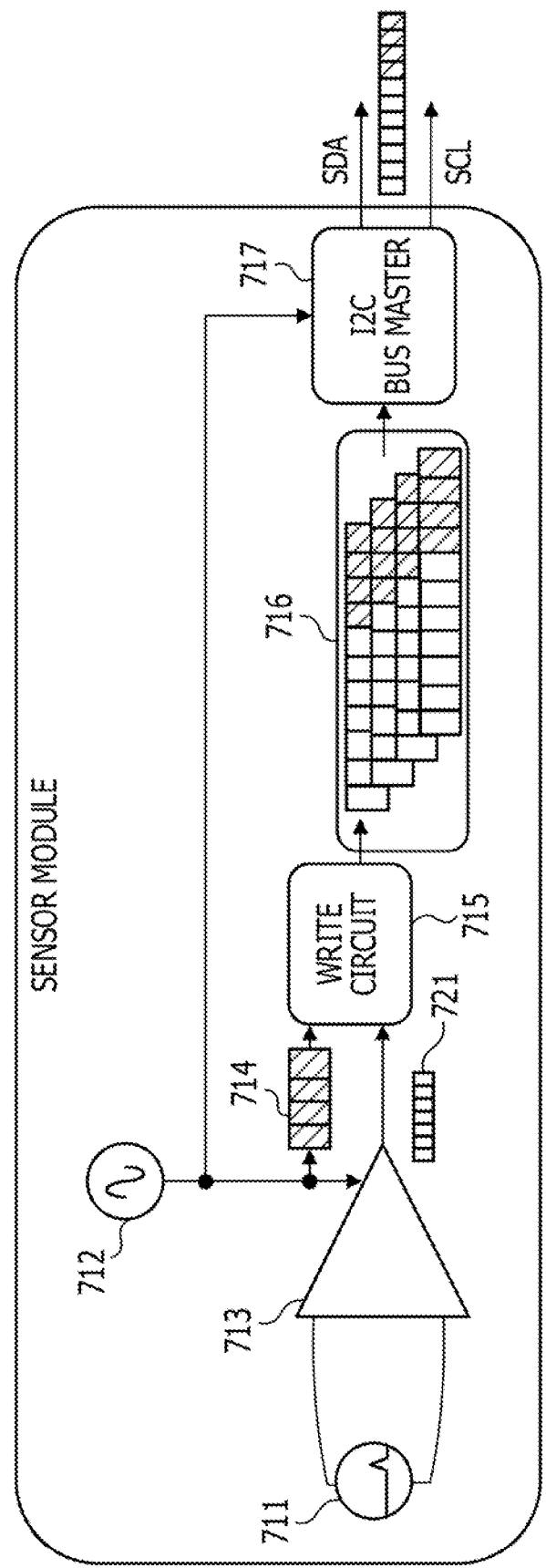
FIG. 7 is a configuration diagram of a sensor module.

FIG. 7 illustrates an example of a configuration of a sensor module which is an example of the information acquisition apparatus 602-$i$. A sensor module 701 illustrated in FIG. 7 includes a pressure sensor 711, a crystal oscillator 712, an analog-to-digital (AD) converter 713, a counter 714, a write circuit 715, a data buffer 716, and an Inter-Integrated Circuit (I2C) bus master 717. In this case, an I2C bus is used as the communication network 603 illustrated in FIG. 6.

The pressure sensor 711 outputs an analog signal indicating a pressure to the AD converter 713. The crystal oscillator 712 outputs a timing signal of a sine wave to the AD converter 713, the counter 714, and the I2C bus master 717.

The counter 714 performs a counting operation in synchronization with the timing signal output by the crystal oscillator 712, and outputs a count value to the write circuit 715. The count value is an example of time information indicating acquisition time of information. The AD converter 713 converts the analog signal output by the pressure sensor 711 into information 721 of a digital signal in synchronization with the timing signal output by the crystal oscillator 712, and outputs the information 721 to the write circuit 715.

The write circuit 715 attaches the count value output by the counter 714 to the information 721 output by the AD converter 713 to generate a packet of sensor data, and outputs the generated packet to the data buffer 716. The data buffer 716 buffers a plurality of packets and outputs the buffered packets to the I2C bus master 717.

The I2C bus master 717 operates in synchronization with the timing signal output by the crystal oscillator 712, and transmits, as serial data SDA, the packets output by the data buffer 716 to the information processing apparatus 601. The I2C bus master 717 transmits a serial clock SCL to the information processing apparatus 601 together with the serial data SDA.

Figure 8:
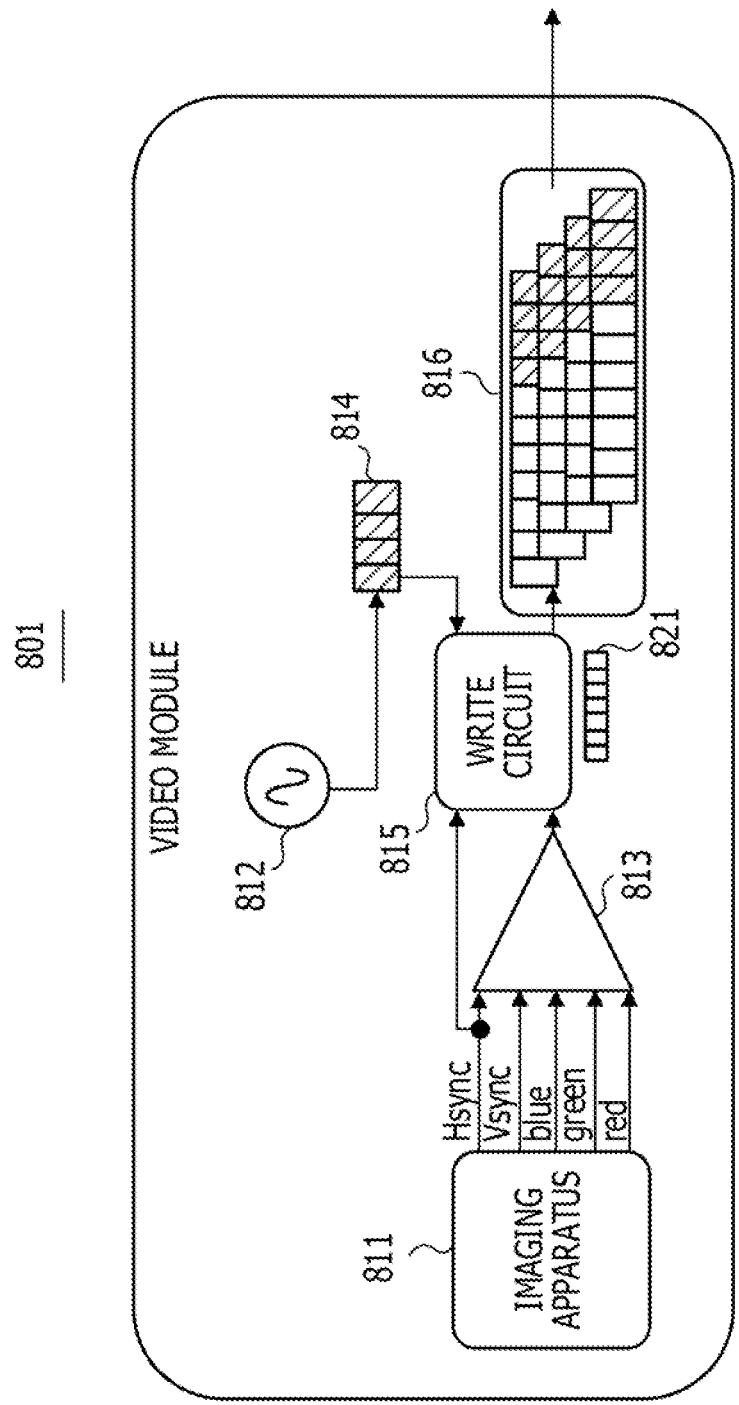
FIG. 8 is a configuration diagram of a video module.

FIG. 8 illustrates an example of a configuration of a video module which is an example of the information acquisition apparatus 602-$i$. A video module 801 illustrated in FIG. 8 includes an imaging apparatus 811, a crystal oscillator 812, an AD converter 813, a counter 814, a write circuit 815, and a data buffer 816.

The imaging apparatus 811 includes an image sensor. The imaging apparatus 811 captures a digital video image and outputs a Video Graphics Array (VGA) signal to the AD converter 813. A VGA signal includes a horizontal synchronizing signal (Hsync), a vertical synchronizing signal (Vsync), a blue video signal, a green video signal, and a red video signal. The Hsync is also output to the write circuit 815. The crystal oscillator 812 outputs a timing signal of a sine wave to the counter 814.

The counter 814 performs a counting operation in synchronization with the timing signal output by the crystal oscillator 812, and outputs a count value to the write circuit 815. The AD converter 813 converts the VGA signal output by the imaging apparatus 811 into image information 821 of a digital signal, and outputs the image information 821 to the write circuit 815. A digital encoder may be used instead of the AD converter 813.

The write circuit 815 operates in synchronization with the Hsync, attaches the count value output by the counter 814 to the image information 821 output by the AD converter 813 to generate a packet of sensor data, and outputs the packet to the data buffer 816. The data buffer 816 buffers a plurality of packets and transmits the buffered packets to the information processing apparatus 601.

The time synchronization unit 613 illustrated in FIG. 6 is implemented by hardware-based control or software-based control. A hardware logic circuit such as an FPGA is used as the time synchronization unit 613 implemented by hardware-based control. A computer is used as the time synchronization unit 613 implemented by software-based control.

The configuration and operation in the case where an FPGA is used as the time synchronization unit 613 will be described below with reference to FIGS. 9 to 178.

Figure 9:
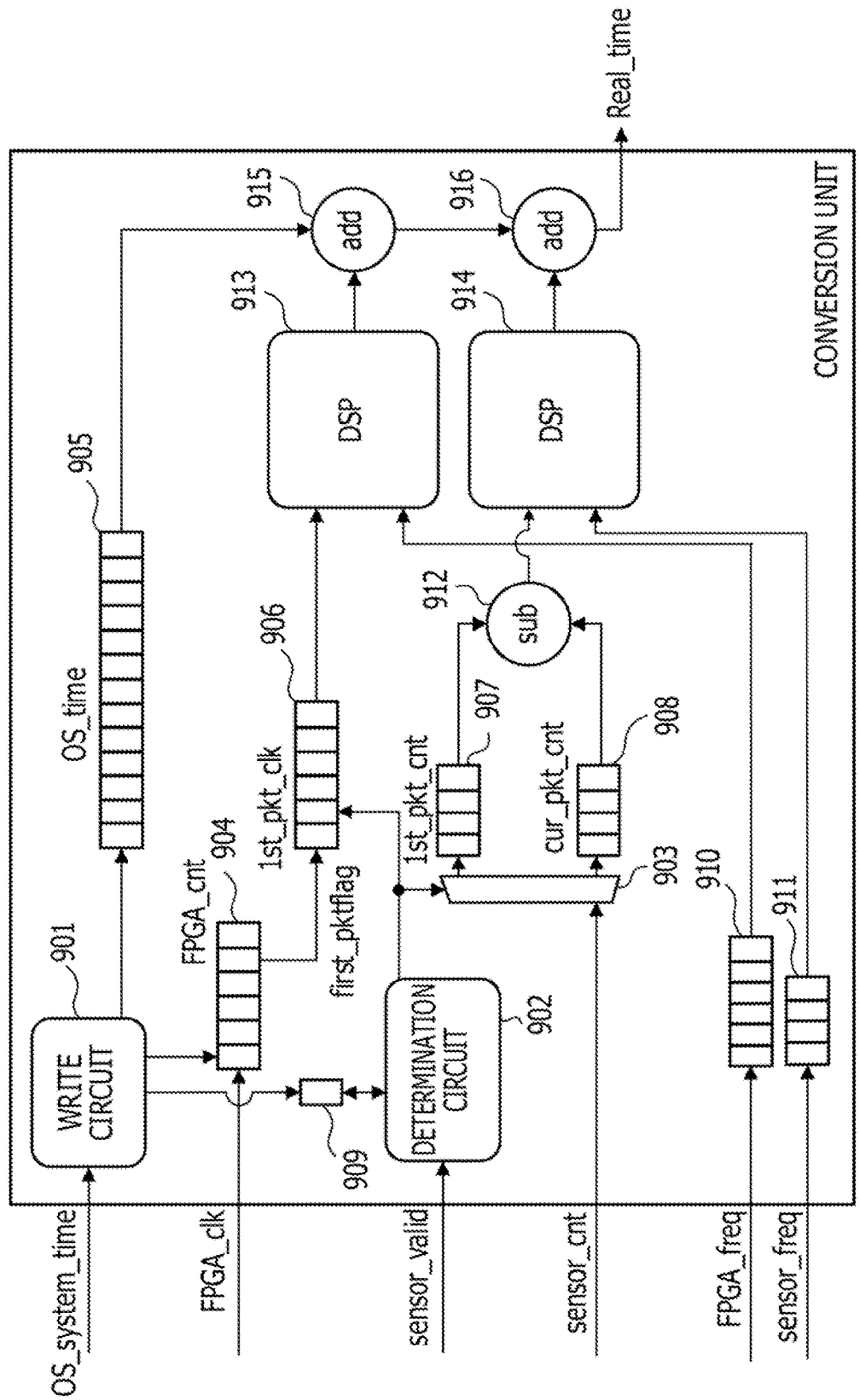
FIG. 9 is a configuration diagram of a conversion unit.

FIG. 9 illustrates an example of a configuration of the conversion unit 624-$i$ illustrated in FIG. 6. The conversion unit 624-$i$ illustrated in FIG. 9 includes a write circuit 901, a determination circuit 902, a selector 903, a counter 904, registers 905 to 911, and a subtractor (sub) 912. The conversion unit 624-$i$ further includes digital signal processors (DSPs) 913 and 914 and adders (add) 915 and 916.

The register 905 corresponds to the storage unit 411 illustrated in FIG. 4. The DSP 913 and the adder 915 correspond to the reception time conversion unit 413 illustrated in FIG. 4. The subtractor 912, the DSP 914, and the adder 916 correspond to the time information conversion unit 414 illustrated in FIG. 4. The subtractor 912 is an example of a subtraction unit. The DSP 914 is an example of a first difference calculation unit. The adder 916 is an example of a first addition unit. The DSP 913 is an example of a second difference calculation unit. The adder 915 is an example of a second addition unit.

Upon receiving OS_system_time which is the OS time output by the CPU 611, the write circuit 901 writes the OS_system_time as the OS_time in the register 905. The register 905 outputs the OS_time to the adder 915.

The write circuit 901 clears the counter 904 and sets a count value FPGA_cnt to 0. The write circuit 901 clears a flag first_pktflag stored in the register 909, and sets the logical value "0" in the first_pktflag. The counter 904 then performs a counting operation in synchronization with a clock signal FPGA_clk used in the time synchronization unit 613, and outputs the count value FPGA_cnt to the register 906.

Upon receiving a packet from the information acquisition apparatus 602-$i$, the reception unit 621 outputs a signal sensor_valid indicating the reception of the packet and a count value sensor_cnt included in the packet to the first frequency calculation unit 622-$i$ and the conversion unit 624-$i$. The sensor_valid and the sensor_cnt are input to the determination circuit 902 and the selector 903, respectively.

Upon receiving the sensor_valid, the determination circuit 902 checks the first_pktflag stored in the register 909. If the first_pktflag is set to the logical value "0", the determination circuit 902 sets the logical value "1" in the first_pktflag and writes the FPGA_cnt output by the counter 904 as 1st_pkt_clk in the register 906.

Therefore, the logical value "1" is set in the first_pktflag when the reception unit 621 receives the first packet after the OS_system_time is written in the register 905, and the FPGA_cnt at that time is set in the 1st_pkt_clk. The 1st_pkt_clk indicates the reception time at which the first packet is received. The register 906 outputs the 1st_pkt_clk to the DSP 913.

The determination circuit 902 subsequently causes the selector 903 to select the register 907. The selector 903 outputs the sensor_cnt to the register 907. The register 907 stores the sensor_cnt as the 1st_pkt_cnt. The determination circuit 902 causes the selector 903 to select the register 908. The selector 903 outputs the sensor_cnt to the register 908. The register 908 stores the sensor_cnt as cur_pkt_cnt.

Therefore, when the reception unit 621 receives the first packet, the sensor_cnt of the packet is set in the 1st_pkt_cnt and the cur_pkt_cnt.

On the other hand, when the first_pktflag is set to the logic value "1", the determination circuit 902 causes the selector 903 to select the register 908. The register 908 stores the sensor_cnt as the cur_pkt_cnt. In this case, the first_pktflag, the 1st_pkt_clk, and the 1st_pkt_cnt are not updated.

Therefore, when the reception unit 621 receives the second or subsequent packet after the OS_system_time is written in the register 905, the sensor_cnt of the packet is set in the cur_pkt_cnt but the 1st_pkt_clk and the 1st_pkt_cnt are not changed.

Thus, the 1st_pkt_cnt represents the sensor_cnt of the first packet, and the cur_pkt_cnt represents the sensor_cnt of the first packet or the second or subsequent packet. The registers 907 and 908 output the 1st_pkt_cnt and the cur_pkt_cnt to the subtractor 912. The subtractor 912 subtracts the 1st_pkt_cnt from the cur_pkt_cnt to obtain a difference between the count values, and outputs the difference to the DSP 914.

Therefore, when the reception unit 621 receives the first packet, the subtractor 912 outputs 0 as the difference between the count values. On the other hand, when the reception unit 621 receives the second or subsequent packet, the subtractor 912 outputs a difference between the sensor_cnt of the received packet and the sensor_cnt of the first packet.

The second frequency calculation unit 623 outputs a frequency FPGA_freq of the clock signal FPGA_clk to the first frequency calculation units 622-1 to 622-N and the conversion units 624-1 to 624-N. The register 910 stores the FPGA_freq, and outputs the FPGA_freq to the DSP 913.

The first frequency calculation unit 622-$i$ outputs a frequency sensor_freq of a timing signal used in the information acquisition apparatus 602-$i$ to the conversion unit 624-$i$. The register 911 stores the sensor_freq and outputs the sensor_freq to the DSP 914.

The DSP 913 calculates a difference between the OS time at which the reception unit 621 has received the first packet and the OS_time stored in the register 905, by using the 1st_pkt_clk output by the register 906 and the FPGA_freq output by the register 910. The DSP 913 is capable of determining the difference by dividing the 1st_pkt_clk by the FPGA_freq. The DSP 913 outputs the calculated difference to the adder 915.

The adder 915 adds the difference output by the DSP 913 to the OS_time output by the register 905 to determine the OS time at which the reception unit 621 has received the first packet, and outputs the determined OS time to the adder 916. In this way, the DSP 913 and the adder 915 successfully convert the 1st_pkt_clk into the OS time indicating the reception time of the first packet.

The DSP 914 calculates, by using the sensor_freq output by the register 911, a difference in the OS time corresponding to a difference between the sensor_cnt of the received packet and the sensor_cnt of the first packet from the difference between the count values output by the subtractor 912. The DSP 914 successfully determines the difference in the OS time by dividing the difference between the count values by the sensor_freq. The DSP 914 outputs the calculated difference to the adder 916.

Since the difference in the OS time output by the DSP 914 is a value obtained by converting the difference in the sensor_cnt based on the sensor_freq, the difference in the OS time does not include time for packet transfer between the information acquisition apparatus 602-$i$ and the time synchronization unit 613. Therefore, the difference in the OS time is independent of the transfer delay of the communication network 603.

The adder 916 adds the difference output by the DSP 914 to the OS time output by the adder 915 to determine OS time which is the time after relative time corresponding to the difference in the sensor_cnt has elapsed from the OS time indicating the reception time of the first packet. The adder 916 outputs the determined OS time as Realtime to the attaching unit 625.

Thus, the subtractor 912, the DSP 914, and the adder 916 successfully convert the sensor_cnt of the received packet into the OS ti e indicating the acquisition time of information included in the packet. The Realtime output by the adder 916 is attached, as a timestamp, to the information included in the received packet.

Figure 10A:
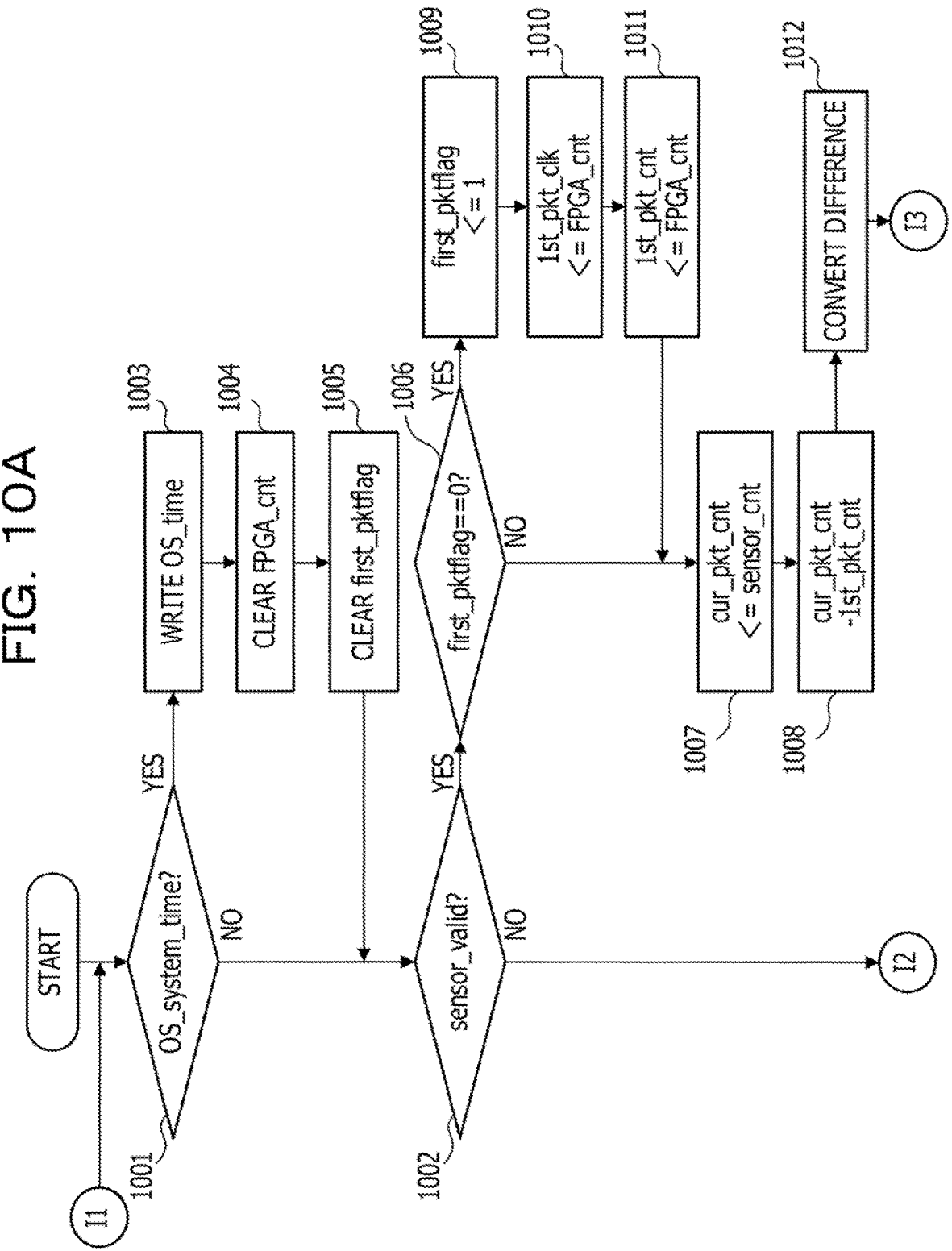
FIG. 10A is a flowchart (part 1) illustrating a specific example of the time synchronization process.
Figure 10B:
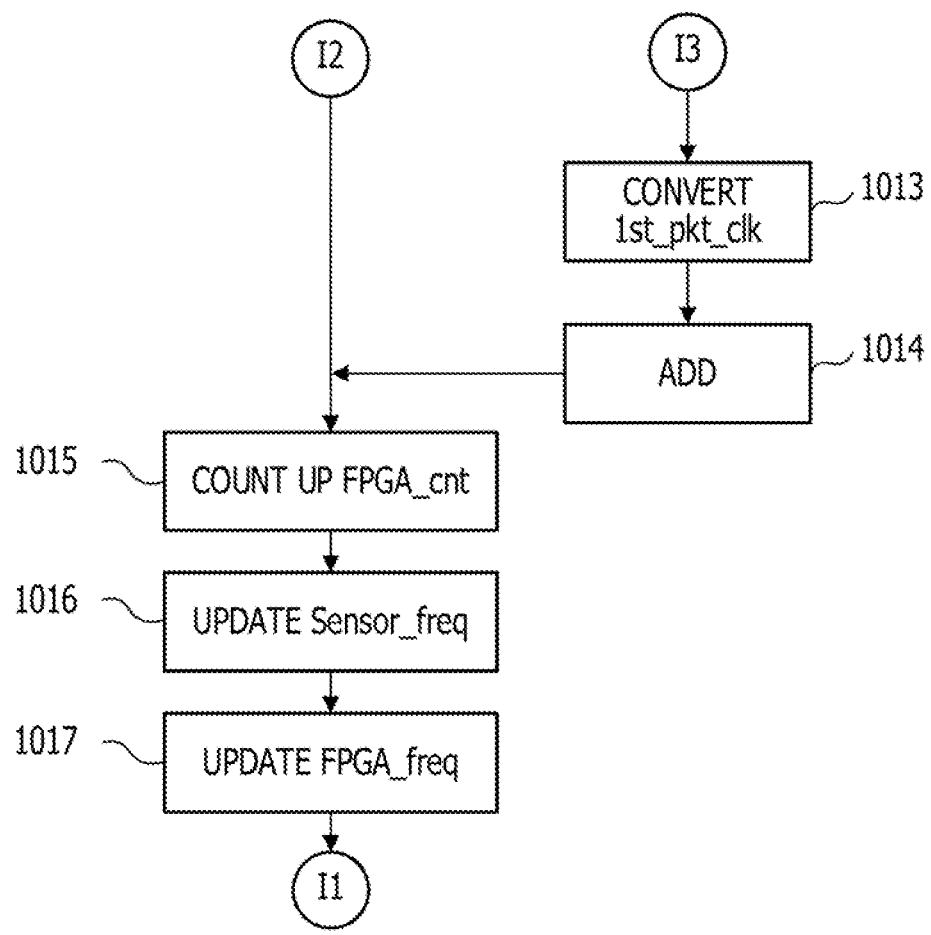

FIGS. 10A and 10B are flowcharts illustrating a specific example of a time synchronization process performed by the conversion unit 624-$i$ illustrated in FIG. 9. First, the write circuit 901 checks whether or not the OS_system_time is received from the CPU 611 (step 1001).

If the OS_system_time is received (YES in step 1001), the write circuit 901 writes the OS_system_time in the register 905 as the OS_time (step 1003). The write circuit 901 clears the FPGA_cnt stored in the counter 904 (step 1004), and clears the first_pktflag stored in the register 909 (step 1005).

Subsequently, the determination circuit 902 checks whether or not the sensor_valid is received from the reception unit 621 (step 1002). If the sensor_valid is received (YES in step 1002), the determination circuit 902 checks the first_pktflag stored in the register 909 (step 1006).

If the first_pktflag is set to the logical value "0" (YES in step 1006), the determination circuit 902 sets the logical value "1" in the first_pktflag (step 1009). The determination circuit 902 writes the FPGA_cnt output by the counter 904 in the register 906 as the 1st_pkt_clk (step 1010).

Subsequently, the selector 903 outputs the sensor_cnt to the register 907, and the register 907 stores the sensor_cnt as the 1st_pkt_cnt (step 1011). The selector 903 outputs the sensor_cnt to the register 908, and the register 908 stores the sensor_cnt as the cur_pkt_cnt (step 1007).

Subsequently, the subtractor 912 subtracts the 1st_pkt_cnt from the cur_pkt_cnt to determine a difference between the count values (step 1008). The DSP 914 converts, by using the sensor_freq stored in the register 911, the difference between the count values output by the subtractor 912 into a difference in the OS time (step 1012).

Subsequently, the DSP 913 converts, by using the FPGA_freq stored in the register 910, the 1st_pkt_clk stored in the register 906 into a difference between the OS time at which the reception unit 621 has received the first packet and the OS_time stored in the register 905 (step 1013).

Subsequently, the adder 915 adds the difference output by the DSP 913 to the OS_time stored in the register 905, and the adder 916 adds the difference output by the DSP 914 to the addition result output by the adder 915 (step 1014), In this way, the Real_time is determined.

Subsequently, the counter 904 counts up the FPGA_cnt (step 1015). The conversion unit 624-$i$ updates the sensor_freq stored in the register 911 (step 1016), and updates the FPGA_freq stored in the register 910 (step 1017). The processing in step 1001 and subsequent steps are then repeated.

When the OS_system_time is not received (NO in step 1001), the conversion unit 624-$i$ performs the processing in step 1002 and the subsequent steps. If the first_pktflag is set to the logical value "1" (NO in step 1006), the conversion unit 624-$i$ performs the processing in step 1007 and the subsequent steps. If the sensor_valid is not received (NO in step 1002), the conversion unit 624-$i$ performs the processing in step 1015 and the subsequent steps.

Figure 11:
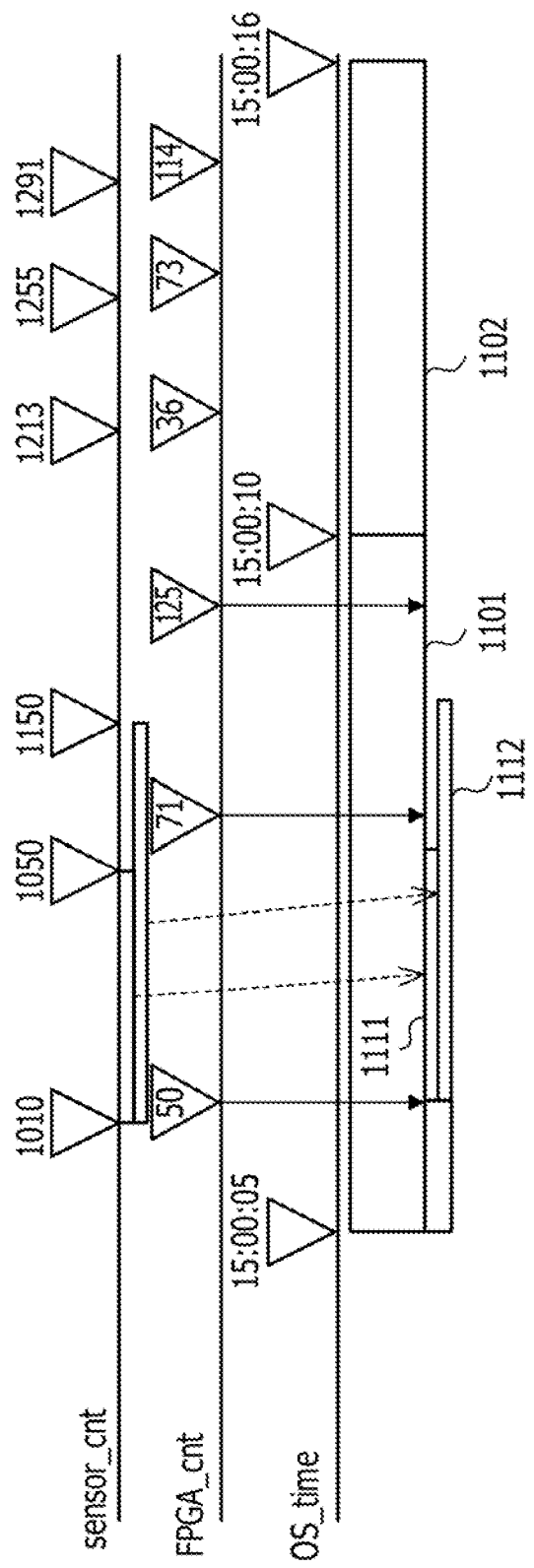
FIG. 11 is a diagram illustrating the time synchronization process.

FIG. 11 illustrates an example of the time synchronization process performed by the conversion unit 624-$i$ illustrated in FIG. 9. The CPU 611 outputs the OS_system_time at a certain timing to update the OS_time stored in the register 905.

In the example of FIG. 11, 15:00:05, 15:00:10, and 15:00:16 are sequentially set as the OS_time A time frame 1101 represents an interval from 15:00:05 to 15:00:10, and a time frame 1102 represents an interval from 15:00:10 to 15:00:16.

In the time frame 1101, the reception unit 621 receives the first packet when the FPGA_cnt is equal to 50, receives the second packet when the FPGA_cnt is equal to 71, and receives the third packet when the FPGA_cnt is equal to 125. The sensor_cnt of the first packet is 1010, the sensor_cnt of the second packet is 1050, and the sensor_cnt of the third packet is 1150.

In this case, "40" which is the difference between the sensor_cnt of the second packet and the sensor_cnt of the first packet is converted into a difference 1111 in the OS time. The difference 1111 is added to the OS time corresponding to FPGA_cnt=50 to determine the Realtime corresponding to sensor_cnt=1050.

In addition, "140" which is the difference between the sensor_cnt of the third packet and the sensor_cnt of the first packet is converted into a difference 1112 in the OS time. The difference 1112 is added to the OS time corresponding to FPGA_cnt=50 to determine the Realtime corresponding to sensor_cnt=1150.

In the time frame 1102, the reception unit 621 receives the first packet when the FPGA_cnt is equal to 36, receives the second packet when the FPGA_cnt is equal to 73, and receives the third packet when the FPGA_cnt is equal to 114. The sensor_cnt of the first packet is 1213, the sensor_cnt of the second packet is 1255, and the sensor_cnt of the third packet is 1291.

In the time frame 1102, the Real_time corresponding to each value of the sensor_cnt is determined in a manner similar to the case of the time frame 1101.

The information processing system illustrated in FIG. 6 attaches, timestamps indicating the OS times at which the information acquisition apparatus 602-$i$ has acquired pieces of information, to the respective pieces of information included in a plurality of packets received in each time frame. Since the difference between the timestamps attached to a plurality of pieces of information represents accurate relative times, the acquisition times of the pieces of information are successfully synchronized with the OS time of the information processing apparatus 601. In this case, it is not required to transmit a reset signal from the information processing apparatus 601 to the information acquisition apparatus 602-$i$ as in the configuration illustrated in FIG. 3.

Even when the information acquisition apparatuses 602-$i$ are operating in synchronization with different timing signals, acquisition times of pieces of information acquired by the information acquisition apparatuses 602-1 to 602-N may be synchronized with one another.

Figure 12:
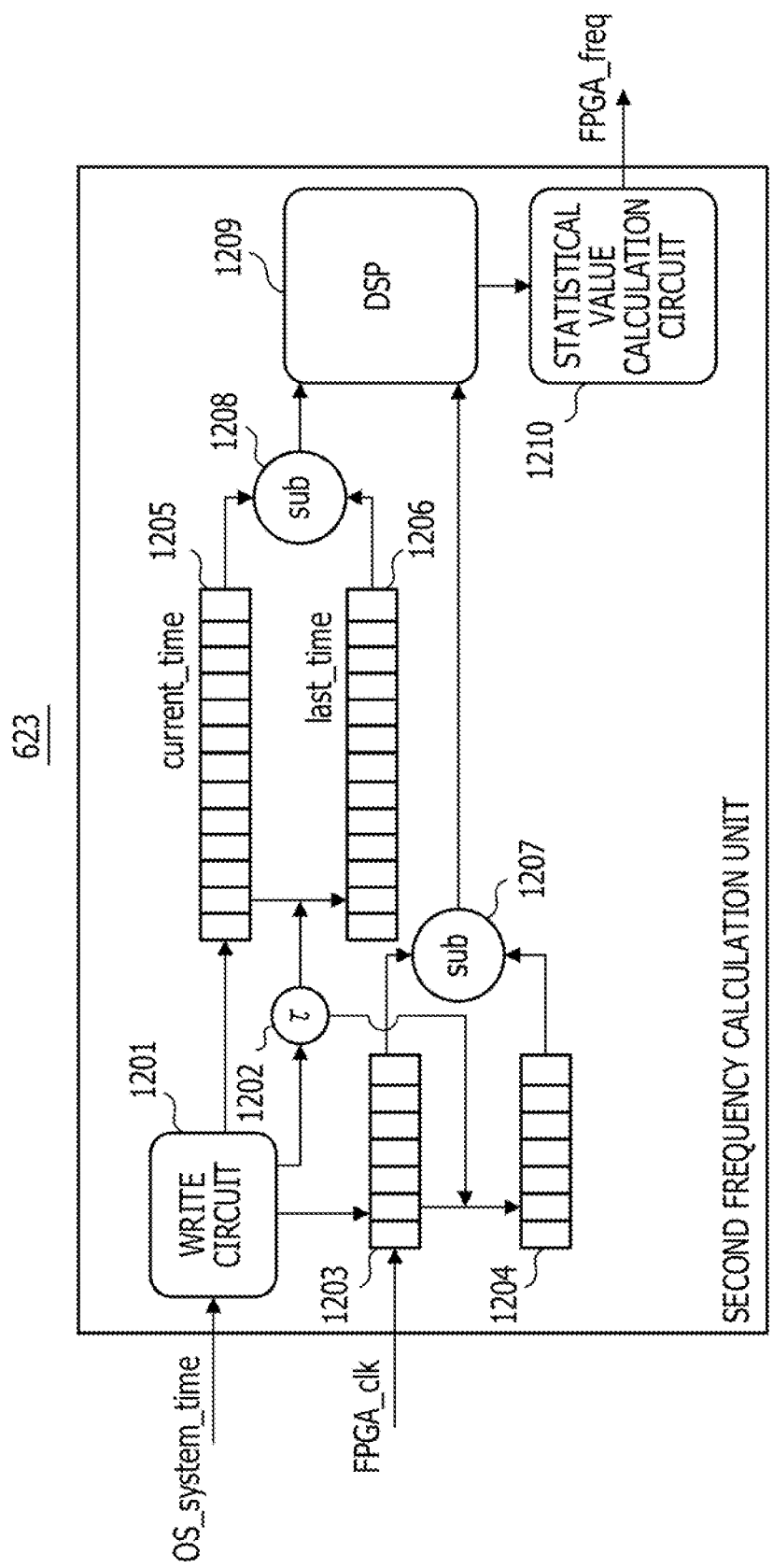
FIG. 12 is a configuration diagram of a second frequency calculation unit.

FIG. 12 illustrates an example of a configuration of the second frequency calculation unit 623 illustrated in FIG. 6. The second frequency calculation unit 623 illustrated in FIG. 12 includes a write circuit 1201, a load circuit (T) 1202, a counter 1203, registers 1204 to 1206, subtractors 1207 and 1208, a DSP 1209, and a statistical value calculation circuit 1210.

Upon receiving the OS_system_time from the CPU 611, the write circuit 1201 outputs a load instruction to the load circuit 1202 and writes the OS_system_time as current_time in the register 1205. The register 1205 outputs the current_time to the subtractor 1208.

The write circuit 1201 clears the counter 1203 and sets 0 as the count value. The counter 1203 then performs a counting operation in synchronization with the FPGA_clk, and outputs the count value to the register 1204 and the subtractor 1207.

The load circuit 1202 writes, as last_time in the register 1206, the current time held immediately before the OS_system_time is written in accordance with the load instruction output by the write circuit 1201. The register 1206 outputs the last time to the subtractor 1208.

The load circuit 1202 writes, in the register 1204, the count value held immediately before the counter 1203 is cleared in accordance with the load instruction output by the write circuit 1201. The register 1204 outputs the count value to the subtractor 1207.

The subtractor 1207 subtracts the count value output by the counter 1203 from the count value output by the register 1204 to determine a difference between the count values, and outputs the difference to the DSP 1209. The subtractor 1208 subtracts the last_time output by the register 1206 from the current_time output by the register 1205 to determine the difference in the OS time, and outputs the difference to the DSP 1209.

The DSP 1209 divides the difference output by the subtractor 1207 by the difference output by the subtractor 1208 to determine the frequency of the FPGA_clk, and outputs the determined frequency to the statistical value calculation circuit 1210. The statistical value calculation circuit 1210 determines a statistical value of a plurality of frequencies output by the DSP 1209, and outputs the calculated statistical value as the FPGA_freq. As the statistical value, an average value, a median value, a mode value, or the like may be used. When it is not required to determine the statistical value, the statistical value calculation circuit 1210 may be omitted.

The second frequency calculation unit 623 illustrated in FIG. 12 successfully determines an accurate frequency even when the frequency of the clock signal FPGA_clk used in the time synchronization unit 613 varies due to a change in the environment. The Real_time illustrated in FIG. 9 may be corrected by using the determined frequency.

Figure 13:
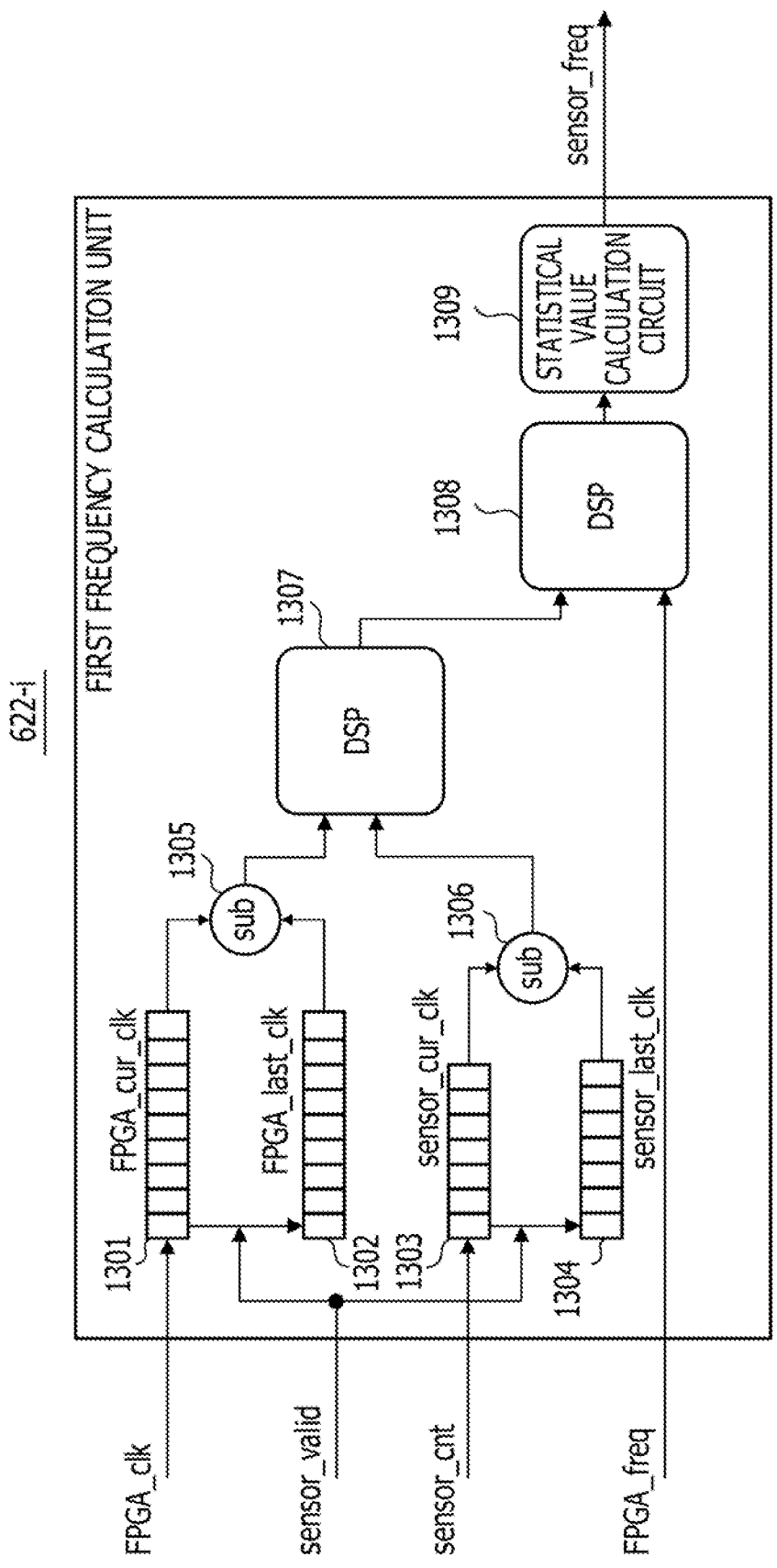

FIG. 13 illustrates an example of a configuration of the first frequency calculation unit 622-*i* illustrated in FIG. 6. The first frequency calculation unit 622-*i* illustrated in FIG. 13 includes a counter 1301, registers 1302 to 1304, subtractors 1305 and 1306, DSPs 1307 and 1308, and a statistical value calculation circuit 1309.

The counter 1301 performs a counting operation in synchronization with the FPGA_clk, and outputs a count value FPGA_cur_clk to the register 1302 and the subtractor 1305. Upon receiving the sensor_valid from the reception unit 621, the first frequency calculation unit 622-*i* writes the FPGA_cur_clk output by the counter 1301, as FPGA_last_clk in the register 1302. The register 1302 outputs the FPGA_last_clk to the subtractor 1305.

The register 1303 stores the sensor_cnt output by the reception unit 621 as sensor_cur_clk, and outputs the sensor_cur_clk to the subtractor 1306. Upon receiving the sensor_valid from the reception unit 621, the first frequency calculation unit 622-*i* writes, as sensor_last_clk in the register 1304, the sensor_cur_clk stored in the register 1303. The register 1304 outputs the sensor_last_clk to the subtractor 1306.

The subtractor 1305 subtracts the FPGA_last_clk output by the register 1302 from the FPGA_cur_clk output by the counter 1301 to determine a difference between the count values, and outputs the difference to the DSP 1307. The subtractor 1306 subtracts the sensor_last_clk output by the register 1304 from the sensor_cur_clk output by the register 1303 to determine a difference in the sensor_cnt, and outputs the difference to the DSP 1307.

The DSP 1307 divides the difference output by the subtractor 1306 by the difference output by the subtractor 1305, and outputs the result of the division to the DSP 1308. The DSP 1308 multiplies the result of the division output by the DSP 1307 by the FPGA_freq output by the second frequency calculation unit 623 to determine a frequency of the timing signal used in the information acquisition apparatus 602-*i*, and outputs the determined frequency to the statistical value calculation circuit 1309. The statistical value calculation circuit 1309 calculates a statistical value of a plurality of frequencies output by the DSP 1308, and outputs the determined statistical value as the sensor_freq. As the statistical value, an average value, a median value, a mode value, or the like may be used. When it is not required to determine the statistical value, the statistical value calculation circuit 1309 may be omitted.

The first frequency calculation unit 622-*i* illustrated in FIG. 13 successfully determines an accurate frequency even when the frequency of the timing signal used in the information acquisition apparatus 602-*i* varies due to a change in the environment. The Realtime illustrated in FIG. 9 may be corrected by using the determined frequency.

FIG. 14 illustrates an example of the frequency FPGA_freq of the clock signal FPGA_clk, which is calculated by the second frequency calculation unit 623 illustrated in FIG. 12. In this example, the statistical calculation by the statistical value calculation circuit 1210 is omitted. A Sub output illustrated in FIG. 14 represents the difference between the count values output by the subtractor 1207. The FPGA_freq is calculated by using equation below.

$$\text{FPGA\_freq} = \text{Sub output}/(\text{current\_time} - \text{last\_time}) \quad (1)$$

In the time synchronization process illustrated in FIG. 11, when the OS_time is 15:00:05, the Sub output is 11000. When the OS_time is 15:00:10, the values of the counter 1203, the register 1204, the current_time, and the last time are as follows: the value of the counter 1203=00000; the value of the register 1204=10000, current_time=15:00:10; and last_time=15:00:05.

In this case, the Sub output is equal to 10000, and the FPGA_freq is calculated by using equation below.

$$\text{FPGA\_freq} = 10000/(10-5) = 2000 \ [\text{Hz}] \quad (2)$$

When the OS_time is 15:00:16, the values of the counter 1203, the register 1204, the current_time, and the last_time are as follows: the value of the counter 1203=00000; the value of the register 1204=11000; current_time=15:00:16; and last_time=15:00:10.

In this case, the Sub output is equal to 11000, and the FPGA_freq is calculated by equation below.

$$\text{FPGA\_freq} = 11000/(16-10) = 1833 \ [\text{Hz}] \quad (3)$$

FIG. 15 illustrates an example of the frequency sensor_freq of the timing signal, which is calculated by the first frequency calculation unit 622-*i* illustrated in FIG. 13. In this example, the statistical calculation by the statistical value calculation circuit 1309 is omitted. The sensor_freq is calculated by using equation below.

$$\text{sensor\_freq} = \{(\text{sensor\_cur\_clk} - \text{sensor\_last\_clk})/(\text{FPGA\_cur\_clk} - \text{FPGA\_last\_clk})\} * \text{FPGA\_freq} \quad (4)$$

When the first packet is received in the time frame 1101 illustrated in FIG. 11, the values of the sensor_cnt, the FPGA_cur_clk, and the FPGA_freq are as follows: sensor_cnt=1010; FPGA_cur_clk=2050; and FPGA_freq=2000.

When the second packet is received, the values of the sensor_cnt, the FPGA_cur_clk, the FPGA_last_clk, the sensor_cur_clk, the sensor_last_clk, and the FPGA_freq are as follows: sensor_cnt=1050; FPGA_cur_clk=2071; FPGA_last_clk=2050; sensor_cur_clk=1050; sensor_last_clk=1010; and FPGA_freq=2000.

In this case, the sensor_freq is calculated by using equation below.

$$\text{sensor\_freq} = \{(1050-1010)/(2071-2050)\} 2000 = 3810 \ [\text{Hz}] \quad (5)$$

When the third packet is received, the values of the sensor_cnt, the FPGA_cur_clk, the FPGA_last_clk, the sensor_cur_clk, the sensor_last_clk, and the FPGA_freq are as follows: sensor_cnt=1150; FPGA_cur_clk=2125; FPGA_last_clk=2071; sensor_cur_clk=1150; sensor_last_clk=1050; and FPGA_freq=2000.

In this case, the sensor_freq is calculated by using equation below.

$$\text{sensor\_freq}=\{(1150-1050)/(2125-2071)\}*2000=3704 \text{ [Hz]} \quad (6)$$

FIG. 16 illustrates an example of the OS time Real_time calculated by the conversion unit 624-$i$ illustrated in FIG. 9. The Real_time is calculated by using equation below.

$$\text{Real\_time}=(\text{cur\_pkt\_cnt}-\text{1st\_pkt\_cnt})/\text{sensor\_freq}+\text{1st\_pkt\_clk}/\text{FPGA\_freq}+\text{OS\_time} \quad (7)$$

In the time synchronization process illustrated in FIG. 11, when the OS_time is 15:00:05, the values of the 1st_pkt_clk, the first_pktflag, the FPGA_freq, and the sensor_freq are as follows: 1st_pkt_clk=0; first_pktflag=0; FPGA_freq=2000; and sensor_freq=4000.

When the first packet is received, the values of the sensor_cnt, the 1st_pkt_clk, the first_pktflag, the 1st_pkt_cnt, the cur_pkt_cnt, the FPGA_freq, and the sensor_freq are as follows: sensor_cnt=1010; 1st_pkt_clk=50; first_pktflag=1; 1st_pkt_cnt=1010; cur_pkt_cnt=1010; FPGA_freq=2000; and sensor_freq=4000.

In this case, the Real_time is calculated by using equation below.

$$\text{Real\_time}=(1010-1010)/4000+50/2000+15:00:05=15:00:05:025 \quad (8)$$

When the second packet is received, the values of the sensor_cnt, the 1st_pkt_clk, the first_pktflag, the 1st_pkt_cnt, the cur_pkt_cnt, the FPGA_freq, and the sensor_freq are as follows: sensor_cnt=1050; 1st_pkt_clk=50; first_pktflag=1; 1st_pkt_cnt=1010; cur_pkt_cnt=1050; FPGA_freq=2000; and sensor_freq=3810.

In this case, the Real_time is calculated by using equation below.

$$\text{Real\_time}=(1050-1010)/3810+50/2000+15:00:05=15:00:05:035 \quad (9)$$

When the third packet is received, the values of the sensor_cnt, the 1st_pkt_clk, the first_pktflag, the 1st_pkt_cnt, the cur_pkt_cnt, the FPGA_freq, and the sensor_freq are as follows: sensor_cnt=1150; 1st_pkt_clk=50; first_pktflag=1; 1st_pkt_cnt=1010; cur_pkt_cnt=1150; FPGA_freq=2000; and sensor_freq=3704.

In this case, the Real_time is calculated by using equation below.

$$\text{Real\_time}=(1150-1010)/3704+50/2000+15:00:05=15:00:05:063 \quad (10)$$

When a failure or the like occurs in the communication network 603, a packet of the sensor data transmitted from the information acquisition apparatus 602-$i$ may be lost and may not reach the information processing apparatus 601. Even in such a case, the time synchronization unit 613 is capable of attaching a timestamp to information included in a packet that reaches the information processing apparatus 601.

FIGS. 17A and 17B each illustrate an example of the time synchronization process performed when a packet is lost in the communication network 603. FIG. 17A illustrates an example of the time synchronization process in the case where the first packet is lost in the time frame 1101 illustrated in FIG. 11.

When the first packet is lost in the time frame 1101 illustrated in FIG. 17A, the reception unit 621 receives the second packet when the FPGA_cnt is equal to 71, and receives the third packet when the FPGA_cnt is equal to 125.

In this case, "100" which is the difference between the sensor_cnt of the third packet and the sensor_cnt of the second packet is converted to a difference 1701 in the OS time. The difference 1701 is added to the OS time corresponding to the FPGA_cnt=71 to determine the Realtime corresponding to the sensor_cnt=1150.

FIG. 17B illustrates an example of the time synchronization process performed in the case where the second packet is lost in the time frame 1101 illustrated in FIG. 11.

When the second packet is lost in the time frame 1101 in FIG. 17B, the reception unit 621 receives the first packet when the FPGA_cnt is equal to 50, and receives the third packet when the FPGA_cnt is equal to 125.

In this case, "140" that is the difference between the sensor_cnt of the third packet and the sensor_cnt of the first packet is converted into the difference 1112 in the OS time. The difference 1112 is added to the OS time corresponding to FPGA_cnt=50 to determine the Real_time corresponding to sensor_cnt=1150.

As described above, even when any of packets in a time frame is lost, the information processing system illustrated in FIG. 6 successfully attaches a timestamp to information included in a subsequent packet by using, as a reference, the OS time at which one of the packets has been received.

Figure 18:
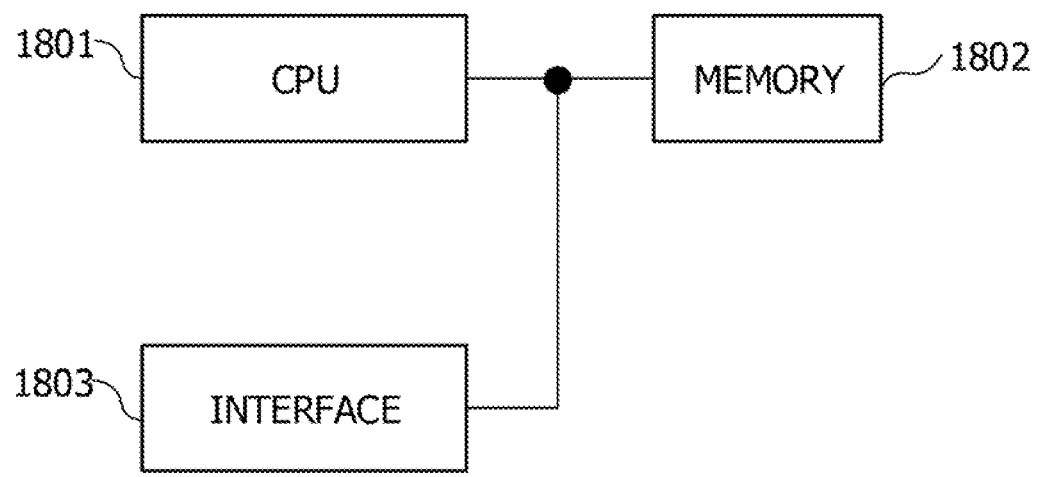
FIG. 18 is a configuration diagram of a time synchronization unit implemented by software-based control.

FIG. 18 illustrates an example of a configuration of the time synchronization unit 613 implemented by software-based control. The time synchronization unit 613 illustrated in FIG. 18 is a computer including a CPU 1801, a memory 1802, and an interface 1803.

The memory 1802 is, for example, a semiconductor memory such as a read-only memory (ROM), a random-access memory (RAM), or a flash memory, and stores programs and data used in processing. The memory 1802 may be used as the storage unit 411 illustrated in FIG. 4.

For example, the CPU 1801 (processor) executes a program by using the memory 1802 to operate as the reception time conversion unit 413, the time information conversion unit 414, and the attaching unit 415 illustrated in FIG. 4. The CPU 1801 executes a program by using the memory 1802 to operate also as a first frequency calculation unit, a second frequency calculation unit, a subtraction unit, a first difference calculation unit, a first addition unit, a second difference calculation unit, and a second addition unit.

The interface 1803 is a communication interface circuit that is coupled to the communication network 603 and performs data conversion involved in communication. The time synchronization unit 613 may receive a program and data from an external apparatus via the interface 1803 and use the program and the data by loading the program and the data to the memory 1802. The interface 1803 may be used as the reception unit 412 illustrated in FIG. 4 or the reception unit 621 illustrated in FIG. 6.

The time synchronization unit 613 illustrated in FIG. 18 may further include a medium driving device that drives a portable recording medium. The portable recording medium may be a memory device, a flexible disk, an optical disc, a magneto-optical disk, or the like. The portable recording medium may also be a compact disc read-only memory (CD-ROM), a digital versatile disc (DVD), a Universal Serial Bus (USB) memory, or the like. An operator or a user may store a program and data on this portable recording medium, and may use the program and the data by loading the program and the data to the memory 1802.

As described above, a computer-readable recording medium having stored therein the program and data used in processing is a physical (non-transitory) recording medium such as the memory 1802 or the portable recording medium.

The configuration of the information processing apparatus 401 illustrated in FIG. 4 is merely an example, and some of the components of the information processing apparatus 401 may be omitted or modified in accordance with the usage or conditions of the information processing apparatus 401.

The configuration of the information processing system illustrated in FIG. 6 is merely an example, and some of the components of the information processing system may be omitted or modified in accordance with the usage or conditions of the information processing system. For example, when the frequency of the clock signal used in the time synchronization unit 613 does not vary much and when the first frequency calculation unit 622-*i* and the conversion unit 624-*i* hold a fixed value indicating the frequency, the second frequency calculation unit 623 may be omitted. When the frequency of the timing signal used in the information acquisition apparatus 602-*i* does not vary much and when the conversion unit 624-*i* holds a fixed value indicating the frequency, the first frequency calculation unit 622-*i* may be omitted.

The information acquisition apparatuses 602-1 to 602-N may be included in the information processing apparatus 601.

The configuration of the sensor module 701 illustrated in FIG. 7 and the configuration of the video module 801 illustrated in FIG. 8 are merely examples, and some of the components of the sensor module 701 and the video module 801 may be omitted or modified in accordance with the usage or conditions of the information processing system. A temperature sensor, a humidity sensor, a wind sensor, or the like may be used instead of the pressure sensor 711 illustrated in FIG. 7.

The configuration of the conversion unit 624-*i* illustrated in FIG. 9, the configuration of the second frequency calculation unit 623 illustrated in FIG. 12, the configuration of the first frequency calculation unit 622-*i* illustrated in FIG. 13, and the configuration of the time synchronization unit 613 illustrated in FIG. 18 are merely examples, and some of the components of the conversion unit 624-*i*, the second frequency calculation unit 623, the first frequency calculation unit 622-*i*, and the time synchronization unit 613 may be omitted or modified in accordance with the usage or conditions of the information processing system.

The flowcharts of FIGS. 5, 10A, and 10B are merely examples, and part of processing may be omitted or modified in accordance with the configuration or conditions of the conversion unit 624-*i*.

The time synchronization process illustrated in FIGS. 11, 17A, and 17B are merely examples, and the sensor_cnt, the FPGA_cnt, and the OS_time change depending on information acquired by the information acquisition apparatus 602-*i*. The calculation results illustrated in FIGS. 14 to 16 are merely examples, and the calculation results change depending on information acquired by the information acquisition apparatus 602-*i*.

The calculation equations (1) to (10) are merely examples, and other calculation equations may be used in accordance with the configuration or conditions of the information processing apparatus 601.

While the embodiment of the disclosure and advantages thereof have been described in detail, those skilled in the art may make various modifications, additions, and omissions without departing from the scope of the present disclosure clearly defined in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention,

What is claimed is:

1. An information processing apparatus comprising:
a memory configured to store first system time; and
a processor coupled to the memory, the processor configured to:
receive, from an information acquisition apparatus after the first system time is written in the memory, first information acquired by the information acquisition apparatus and first time information indicating first acquisition time of the first information;
receive, from the information acquisition apparatus after receiving the first information and the first time information, second information and second time information indicating second acquisition time of the second information;
convert, based on the first system time, reception time at which the first information and the first time information are received into second system time;
convert, based on the second system time and the first time information, the second time information into third system time;
attach the second system time to the first information; and
attach the third system time to the second information.

2. The information processing apparatus according to claim 1, wherein the processor is configured to:
generate a difference between the second time information and the first time information;
calculate a difference between the third system time and the second system time from the difference between the second time information and the first time information; and
add the difference between the third system time and the second system time to the second system time to determine the third system time.

3. The information processing apparatus according to claim 2, wherein the processor is configured to:
calculate a frequency of a timing signal with which the first acquisition time or the second acquisition time is generated in the information acquisition apparatus, by utilizing the difference between the second time information and the first time information, a clock signal, and a frequency of the clock signal;
utilize, as the reception time, time that is identified based on the clock signal when receiving the first information and the first time information; and
calculate the difference between the third system time and the second system time by utilizing the difference between the second time information and the first time information and the frequency of the timing signal.

4. The information processing apparatus according to claim 3, wherein the processor is configured to:
calculate a difference between the second system time and the first system time by utilizing the reception time and the frequency of the clock signal; and
add the difference between the second system time and the first system time to the first system time to determine the second system time.

5. The information processing apparatus according to claim 4, wherein the processor is configured to:
  calculate the frequency of the clock signal by utilizing the first system time and the clock signal.

6. The information processing apparatus according to claim 1, wherein the processor is configured to:
  receive, from a specific information acquisition apparatus among a plurality of information acquisition apparatuses including the information acquisition apparatus, first information acquired by the specific information acquisition apparatus and first time information after the first system time is written in the memory;
  receive, from the specific information acquisition apparatus, second information and second time information after receiving the first information and the first time information;
  attach the second system time to the first information received from the specific information acquisition apparatus; and
  attach the third system time to the second information received from the specific information acquisition apparatus.

7. A time synchronization method performed by an information processing apparatus, the time synchronization method comprising:
  receiving, from an information acquisition apparatus after first system time is written in a memory, first information acquired by the information acquisition apparatus and first time information indicating first acquisition time of the first information;
  receiving, from the information acquisition apparatus after receiving the first information and the first time information, second information and second time information indicating second acquisition time of the second information;
  converting, based on the first system time, reception time of the first information and the first time information into second system time;
  converting, based on the second system time and the first time information, the second time information into third system time;
  attaching the second system time to the first information; and
  attaching the third system time to the second information.

8. The time synchronization method according to claim 7, further comprising:
  generating a difference between the second time information and the first time information;
  calculating a difference between the third system time and the second system time from the difference between the second time information and the first time information; and
  adding the difference between the third system time and the second system time to the second system time to determine the third system time.

9. The time synchronization method according to claim 8, further comprising:
  calculating a frequency of a timing signal with which the first acquisition time or the second acquisition time is generated in the information acquisition apparatus, by utilizing the difference between the second time information and the first time information, a clock signal, and a frequency of the clock signal;
  utilizing, as the reception time, time that is identified based on the clock signal when the first information and the first time information are received, and
  calculating the difference between the third system time and the second system time by utilizing the difference between the second time information and the first time information and the frequency of the timing signal.

10. The time synchronization method according to claim 9, further comprising:
  calculating a difference between the second system time and the first system time by utilizing the reception time and the frequency of the clock signal; and
  adding the difference between the second system time and the first system time to the first system time to determine the second system time.

11. A non-transitory computer-readable recording medium having stored therein a time synchronization program for causing a computer to execute a process, the process comprising:
  receiving, from an information acquisition apparatus after first system time is written in a memory, first information acquired by the information acquisition apparatus and first time information indicating first acquisition time of the first information;
  receiving, from the information acquisition apparatus after receiving the first information and the first time information, second information and second time information indicating second acquisition time of the second information;
  converting, based on the first system time, reception time of the first information and the first time information into second system time;
  converting, based on the second system time and the first time information, the second time information into third system time;
  attaching the second system time to the first information; and
  attaching the third system time to the second information.

12. The non-transitory computer-readable recording medium according to claim 11, further comprising:
  generating a difference between the second time information and the first time information;
  calculating a difference between the third system time and the second system time from the difference between the second time information and the first time information; and
  adding the difference between the third system time and the second system time to the second system time to determine the third system time.

13. The non-transitory computer-readable recording medium according to claim 12, further comprising:
  calculating a frequency of a timing signal with which the first acquisition time or the second acquisition time is generated in the information acquisition apparatus, by utilizing the difference between the second time information and the first time information, a clock signal, and a frequency of the clock signal;
  utilizing, as the reception time, time that is identified based on the clock signal when the first information and the first time information are received; and
  calculating the difference between the third system time and the second system time by utilizing the difference between the second time information and the first time information and the frequency of the timing signal.

14. The non-transitory computer-readable recording medium according to claim 13, further comprising:
  calculating a difference between the second system time and the first system time by utilizing the reception time and the frequency of the clock signal; and adding the difference between the second system time and the first system time to the first system time to determine the second system time.

\* \* \* \* \*